(12) United States Patent
Jo

(10) Patent No.: US 9,036,050 B2
(45) Date of Patent: May 19, 2015

(54) IMAGE PROCESSING DEVICE, IMAGE PROCESSING METHOD, AND PROGRAM

(71) Applicant: Sony Corporation, Tokyo (JP)

(72) Inventor: Kensei Jo, Tokyo (JP)

(73) Assignee: Sony Corporation, Tokyo (JP)

( * ) Notice: Subject to any disclaimer, the term of this patent is extended or adjusted under 35 U.S.C. 154(b) by 32 days.

(21) Appl. No.: 13/857,261

(22) Filed: Apr. 5, 2013

(65) Prior Publication Data
US 2013/0271623 A1 Oct. 17, 2013

(30) Foreign Application Priority Data

Apr. 12, 2012 (JP) .................................. 2012-090897

(51) Int. Cl.
| | |
|---|---|
| *H04N 9/73* | (2006.01) |
| *H04N 5/235* | (2006.01) |
| *G06T 5/50* | (2006.01) |
| *H04N 5/355* | (2011.01) |

(52) U.S. Cl.
CPC ............... *H04N 5/2357* (2013.01); *G06T 5/50* (2013.01); *H04N 5/2353* (2013.01); *H04N 5/2355* (2013.01); *H04N 5/35581* (2013.01); *G06T 2207/10004* (2013.01); *G06T 2207/10024* (2013.01); *G06T 2207/10144* (2013.01); *G06T 2207/20208* (2013.01); *G06T 2207/20221* (2013.01)

(58) Field of Classification Search
CPC . H04N 5/2357; H04N 5/2353; H04N 5/2355; H04N 5/35581; G06T 5/50
USPC ............................................. 348/226.1, 228.1
See application file for complete search history.

(56) References Cited

U.S. PATENT DOCUMENTS

| | | | | |
|---|---|---|---|---|
| 2011/0267506 | A1* | 11/2011 | Klijn et al. ..................... | 348/241 |
| 2011/0317028 | A1* | 12/2011 | Shinmei et al. ............. | 348/223.1 |

FOREIGN PATENT DOCUMENTS

JP 2011-160090 8/2011

* cited by examiner

*Primary Examiner* — Paul Berardesca
(74) *Attorney, Agent, or Firm* — Wolf, Greenfield & Sacks, P.C.

(57) ABSTRACT

There is provided an image processing device including a first flicker component calculation unit that calculates a flicker component of a first exposure image which is a photographed image of a first exposure time, a second flicker component calculation unit that calculates a flicker component of a second exposure image which is a photographed image of a second exposure time different from the first exposure time, a first exposure image flicker correction unit that performs flicker correction on the first exposure image by applying the flicker component of the first exposure image calculated by the first flicker component calculation unit and generates a flicker-corrected first exposure image, and a second exposure image flicker correction unit that performs flicker correction on the second exposure image by applying the flicker component of the second exposure image calculated by the second flicker component calculation unit and generates a flicker-corrected second exposure image.

20 Claims, 17 Drawing Sheets

FIG. 8
FIRST EXPOSURE CONDITION
(SHORT-TIME EXPOSURE)
SECOND EXPOSURE CONDITION
(LONG-TIME EXPOSURE)

FIG. 14

IMAGE PROCESSING DEVICE, IMAGE PROCESSING METHOD, AND PROGRAM

BACKGROUND

The present disclosure relates to an image processing device, an image processing method, and a program, and more particularly, to an image processing device, an image processing method, and a program that correct flicker occurring in an image.

When an image is photographed by a camera that includes an XY address scanning type image sensor such as a complementary metal oxide semiconductor (CMOS) image sensor under illumination of a fluorescent lamp, striped luminance irregularity or color irregularity occurs in a video image. This phenomenon is called flicker. The flicker is caused due to an operation principle of an image sensor, since a fluorescent lamp connected to a commercial power supply (alternating current) basically flicks repeatedly at a double period of a power frequency.

In an image in which flicker occurs, a luminance change pattern with a striped shape extending in a horizontal direction appears. For example, when a moving image is observed, there is a problem that a vertically flowing striped shape may be observed.

As a technology for suppressing such flicker disclosed in the related art, there is Japanese Unexamined Patent Application Publication No. 2011-160090.

Japanese Unexamined Patent Application Publication No. 2011-160090 discloses a method of extracting a flicker component from an image, calculating a flicker correction coefficient configured by a reversed phase pattern of the flicker component, and removing the flicker component included in the image by performing correction by multiplying a pixel value of the image by the calculated flicker correction coefficient.

In recent years, for example, imaging devices that photograph a plurality of images set at different exposure times, combine the images of the different exposure times, and generate a wide dynamic range image in which more accurate pixel values are set from a low luminance portion to a high luminance portion have been suggested to generate a wide dynamic range image.

Thus, when the process disclosed in Japanese Unexamined Patent Application Publication No. 2011-160090 is applied to imaging devices photographing images of a plurality of different exposure times, it is necessary to individually perform the following processes on each of the plurality of images in which different exposure times are set:

a process of extracting a flicker component;

a process of calculating a correction coefficient of a reversed phase pattern of the flicker component; and a correction process based on the correction coefficient.

Thus, since a hardware configuration may increase or a processing time may increase to perform the above-mentioned processes on each of the images of the different exposure times, it is undesirable to perform the processes.

SUMMARY

It is desirable to provide an image processing device, an image processing method, and a program capable of effectively performing a process of reducing a flicker component with a simple configuration for generation of an output image using images of a plurality of different exposure times.

According to a first embodiment of the present disclosure, there is provided an image processing device including a first flicker component calculation unit that calculates a flicker component of a first exposure image which is a photographed image of a first exposure time, a second flicker component calculation unit that calculates a flicker component of a second exposure image which is a photographed image of a second exposure time different from the first exposure time, a first exposure image flicker correction unit that performs flicker correction on the first exposure image by applying the flicker component of the first exposure image calculated by the first flicker component calculation unit and generates a flicker-corrected first exposure image, and a second exposure image flicker correction unit that performs flicker correction on the second exposure image by applying the flicker component of the second exposure image calculated by the second flicker component calculation unit and generates a flicker-corrected second exposure image. The second flicker component calculation unit calculates the flicker component of the second exposure image as a linear sum of the flicker components of the first exposure images calculated by the first flicker component calculation unit.

According to the embodiment of the present disclosure, the first flicker component calculation unit may calculate a flicker component $g(t, E1)$ of the first exposure image as a function of an exposure time $E1$ of the first exposure image and an exposure end time $t$ of each pixel of the first exposure image, and the second flicker component calculation unit may calculate a flicker component $g(t, E2)$ of the second exposure image of an exposure time $E2$ as the linear sum of the flicker components $g(t, E1)$ of the first exposure images calculated by the first flicker component calculation unit.

According to the embodiment of the present disclosure, the first flicker component calculation unit may calculate a flicker component $g(t, E1)$ of the first exposure image as a function of an exposure time $E1$ of the first exposure image and an exposure end time $t$ of each pixel of the first exposure image, and when an exposure time $E2$ of the second exposure image is an integer multiple of the exposure time $E1$ of the first exposure image, the second flicker component calculation unit may calculate a flicker component $g(t, E2)$ of the second exposure image of the exposure time $E2$ as the linear sum of the flicker components $g(t, E1)$ of a plurality of first exposure images corresponding to different exposure end times $t$ of the first exposure image.

According to the embodiment of the present disclosure, the first flicker component calculation unit may calculate a flicker component $g(t, E1)$ of the first exposure image as a function of an exposure time $E1$ of the first exposure image and an exposure end time $t$ of each pixel of the first exposure image, and when an exposure time $E2$ of the second exposure image is not an integer multiple of the exposure time $E1$ of the first exposure image, the second flicker component calculation unit may approximate a total amount of environmental light which is a cause of flicker occurrence during an exposure period $kE1$ less than the exposure time $E1$ of the first exposure image, where $k<1$, to $k$ times the total amount of the environmental light within the exposure time $E1$, and calculates a flicker component $g(t, E2)$ of the second exposure image of the exposure time $E2$ as the linear sum of the flicker components $g(t, E1)$ of the first exposure images based on the approximation.

According to the embodiment of the present disclosure, the first exposure image flicker correction unit may generate the flicker-corrected first exposure image by multiplying a pixel value of the first exposure image by a reciprocal of the flicker component of the first exposure image calculated by the first flicker component calculation unit, and the second exposure image flicker correction unit may generate the flicker-corrected second exposure image by multiplying a pixel value of the second exposure image by a reciprocal of the flicker component of the second exposure image calculated by the second flicker component calculation unit.

According to the embodiment of the present disclosure, the image processing device may further include a sensitivity-classified interpolation unit that receives an input of an image formed by a pixel of the first exposure time and a pixel of the second exposure time and generates the first exposure image which is the photographed image of the first exposure time and the second exposure image which is the photographed image of the second exposure time through a pixel interpolation process. The first flicker component calculation unit may receive an input of the first exposure image generated by the sensitivity-classified interpolation unit and calculates the flicker component of the first exposure image, and the second flicker component calculation unit may receive an input of the second exposure image generated by the sensitivity-classified interpolation unit and calculates the flicker component of the second exposure image.

According to the embodiment of the present disclosure, the image processing device may further include an image combining unit that generates an output image by performing a combining process of combining the flicker-corrected first exposure image and the flicker-corrected second exposure image.

According to the embodiment of the present disclosure, the image combining unit may include an exposure correction unit that performs exposure correction to match brightness of corresponding pixels of the flicker-corrected first exposure image and the flicker-corrected second exposure image, a blend coefficient calculation unit that determines a blend ratio of corresponding pixel values of the flicker-corrected first exposure image and the flicker-corrected second exposure image in accordance with pixel values of the flicker-corrected first exposure image and the flicker-corrected second exposure image, and a blend processing unit that performs a blend process of blending the corresponding pixel values of the flicker-corrected first exposure image and the flicker-corrected second exposure image in accordance with the blend ratio determined by the blend coefficient calculation unit.

According to a second embodiment of the present disclosure, there is provided an image processing method performed by an image processing device, the method including calculating, by a first flicker component calculation unit, a flicker component of a first exposure image which is a photographed image of a first exposure time, calculating, by a second flicker component calculation unit, a flicker component of a second exposure image which is a photographed image of a second exposure time different from the first exposure time, performing, by a first exposure image flicker correction unit, flicker correction on the first exposure image by applying the flicker component of the first exposure image calculated by the first flicker component calculation unit and generating a flicker-corrected first exposure image, and performing, by a second exposure image flicker correction unit, flicker correction on the second exposure image by applying the flicker component of the second exposure image calculated by the second flicker component calculation unit and generating a flicker-corrected second exposure image. In the step of calculating the flicker component of the second exposure image, the flicker component of the second exposure image may be calculated as a linear sum of the flicker components of the first exposure images calculated in the step of calculating the flicker component of the first exposure image.

According to a third embodiment of the present disclosure, there is provided a program for causing an image processing device to perform image processing, the program causing a first flicker component calculation unit to calculate a flicker component of a first exposure image which is a photographed image of a first exposure time, a second flicker component calculation unit to calculate a flicker component of a second exposure image which is a photographed image of a second exposure time different from the first exposure time, a first exposure image flicker correction unit to perform flicker correction on the first exposure image by applying the flicker component of the first exposure image calculated by the first flicker component calculation unit and generate a flicker-corrected first exposure image, and a second exposure image flicker correction unit to perform flicker correction on the second exposure image by applying the flicker component of the second exposure image calculated by the second flicker component calculation unit and generating a flicker-corrected second exposure image. In the step of calculating the flicker component of the second exposure image, the flicker component of the second exposure image is calculated as a linear sum of the flicker components of the first exposure images calculated in the step of calculating the flicker component of the first exposure image.

Note that the program according to the present disclosure is a program that can be provided in a storage medium or communication medium that is provided in a computer-readable form for an information processing device or a computer system that is capable of executing various types of program code, for example. Providing this sort of program in a computer-readable form makes it possible to implement the processing according to the program in the information processing device or the computer system.

The purposes, features, and advantages of the present disclosure will be made clear later by a more detailed explanation that is based on the embodiments of the present disclosure and the appended drawings. Furthermore, the system in this specification is not limited to being a configuration that logically aggregates a plurality of devices, all of which are contained within the same housing.

According to an embodiment of the present disclosure, the device and the method of performing the process of correcting the flicker of an image are realized.

Specifically, a first flicker component calculation unit calculates a flicker component of a first exposure image. A second flicker component calculation unit calculates a flicker component of a second exposure image. Flicker correction is performed on the first exposure image by applying the flicker component of the first exposure image. Flicker correction is performed on the second exposure image by applying the flicker component of the second exposure image. An image which is the same as, for example, a wide-dynamic range image is generated through a combining process of combining a flicker-corrected first exposure image and a flicker-corrected second exposure image. The second flicker component calculation unit calculates the flicker component of the second exposure image as a linear sum of the flicker components of the first exposure images calculated by the first flicker component calculation unit.

Since the process of calculating the flicker components is simplified through such processes, efficiency of the hardware configuration and the process is realized.

BRIEF DESCRIPTION OF THE DRAWINGS

FIG. 8 is a diagram illustrating an exposure control process of an image sensor;

FIG. 14 is a diagram illustrating an exposure control process of an image sensor;

DETAILED DESCRIPTION OF THE EMBODIMENTS

Figure 1:
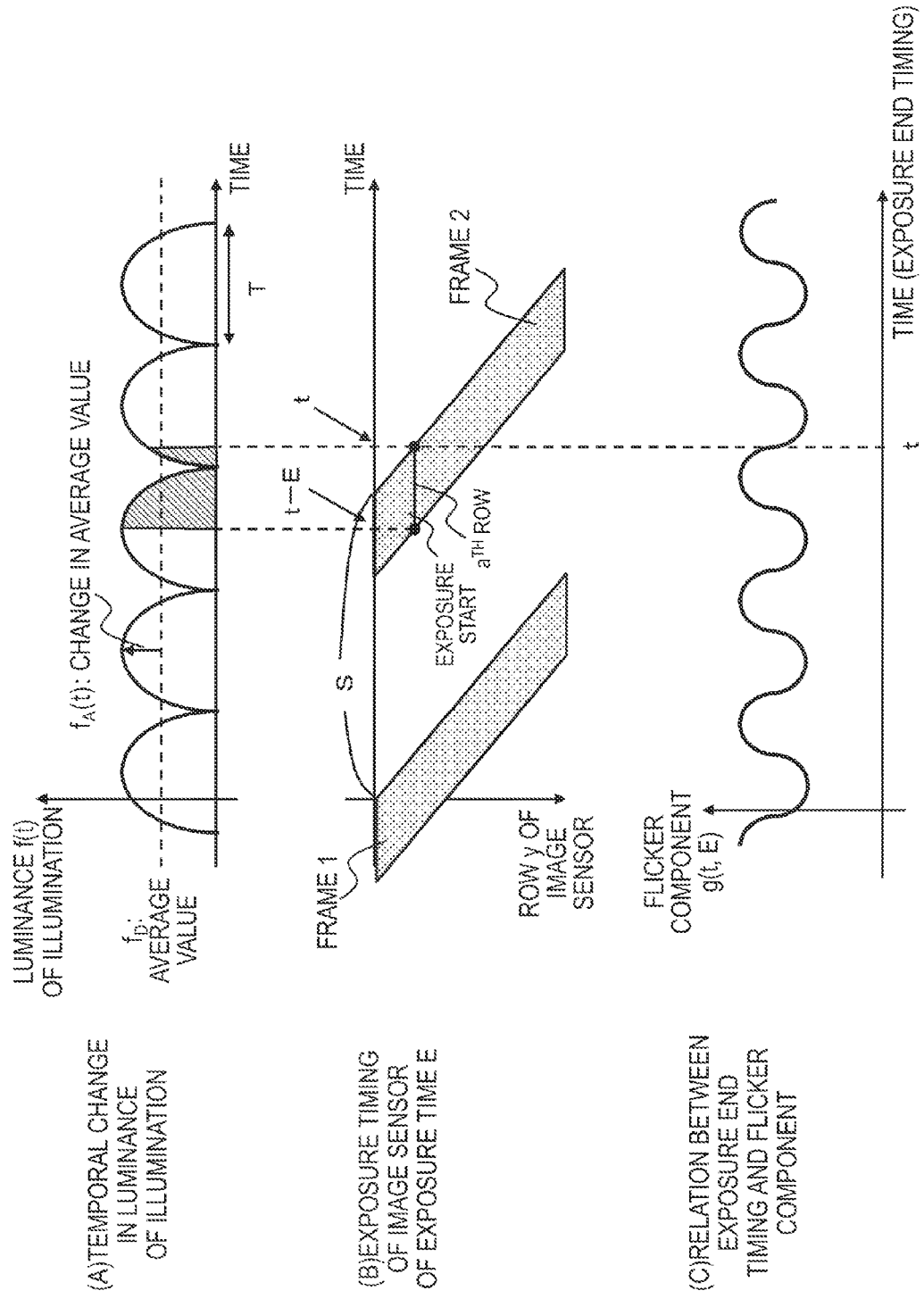
FIGS. 1(A) to 1(C) are diagrams illustrating a flicker occurrence principle and correction.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, an image processing device, an image processing method, and a program according to embodiments of the present disclosure will be described in detail with reference to the drawings. The description will be made in the following items.

1. Flicker Occurrence Principle and Correction Principle
2. Overview of Process Performed by Image Processing Device According to Embodiments of the Present Disclosure
3. Configuration and Process of Image Processing Device According to First Embodiment of the Present Disclosure
4. Example of Exposure Control Configuration of image sensor in Image Processing Device According to First Embodiment
5. Details of Image Processing Unit in Image Processing Device According to First Embodiment
6. Configuration and Process of Image Processing Device According to Second Embodiment of the Present Disclosure
7. Summarization of Configuration According to Embodiments of the Present Disclosure

[1. Flicker Occurrence Principle and Correction Principle]

First, a flicker occurrence principle and a flicker correction principle will be described below with reference to FIGS. 1(A) to 1(C).

FIG. 1(A) is a diagram illustrating a temporal change of illumination luminance under the environment in which an image is photographed by a camera. In general, since a commercial power supply is an alternating power supply of 50 Hz or 60 Hz, it is easy for illumination light such as light of a fluorescent lamp to fluctuate at a frequency of 100 Hz or 120 Hz.

The horizontal axis represents a time t and the vertical axis represents illumination light luminance f(t) at each time t.

When the illumination light luminance f(t) at a time t is decomposed into an average value $f_D$ of the illumination light luminance and change $f_A(t)$ in the average value of the illumination light luminance, an expression is as follows:

$$f(t)=f_D+f_A(t).$$

The average value $f_D$ of the illumination light luminance is a constant value which does not depend on the time t.

The change $f_A(t)$ in the average value is a value that varies at a period according to the frequency of the illumination.

Further, on the assumption that f(t) is the illumination light luminance and T is the period of the luminance f(t), the following relation is satisfied.

$$f(t+T)=f(t)$$

$$\int_t^{t+T} f(t)dt = f_D$$

$$\int_t^{t+T} f_A(t)dt = 0$$

A flicker correction process is a process of removing the influence of the change $f_A(t)$ in the average value of the illumination light luminance from an observation image, that is, an image photographed by the camera.

FIG. 1(B) is a schematic diagram illustrating an exposure timing of an image sensor at which an imaging timing is different for each row, as in a CMOS image sensor.

The horizontal axis represents a time t and the vertical axis represents a row y of the image sensor.

An example shown in the drawing is an example of a case in which continuous image frames are photographed at a constant interval S. Exposure timings are shown when two images of frame 1 and frame 2 are photographed.

In the photographing of each frame image, exposure is performed sequentially from the high-order row to the low-order row of the image sensor.

Since the exposure timings at the time of photographing each frame image are different for each row of the image sensor, the influence of the accumulated illumination light is also different for each row.

For example, it is assumed that t is an exposure end time of the exposure time E at a given pixel of the image sensor. On the assumption that a sum of the illumination light during the exposure of the pixel under the influence of the flicker is $F_A(t, E)$, $F_A(t, E)$ can be described as follows.

$$F_A(t,E)=\int_{t-E}^{t} f(t)dt = f_D \cdot E + \int_{t-E}^{t} f_A(t)dt$$

It is assumed that the sum of the illumination light is $F_D(t, E)$ under an ideal condition that no flicker occurs.

Since there is no influence of the flicker, $F_D(t, E)$ becomes the change $f_A(t)=0$ in the average value of the illumination light luminance, and thus can be expressed as follows:

$$F_D(t,E)=f_D \times E.$$

Here, a "flicker component" is defined as a ratio of an ideal image with no flicker to an image influenced by flicker. The flicker component is the same as a ratio of the sum of the illumination light during accumulation of the pixel.

Accordingly, the flicker component g(t, E) of the pixel at the exposure end time t in the image sensor of the exposure time E can be formulated as in the following equation (Equation 1).

$$g(t, E) = \frac{F_A(t, E)}{F_D(t, E)} = \frac{Ef_D + \int_{t-E}^{t} f_A(t)dt}{Ef_D} \quad \text{(Equation 1)}$$

FIG. 1(C) is a diagram schematically illustrating a relation between an exposure end timing t and the flicker component g(t, E). The horizontal axis represents the exposure end timing t of each pixel of the image and the vertical axis represents the flicker component g(t, E).

As described above, since the illumination light fluctuates periodically, the flicker component also has periodicity. Therefore, once the flicker component g(t, E) can be calculated, the flicker component g(t, E) corresponding to all the exposure end timings t can be basically estimated.

As shown in FIG. 1(B), the exposure end timing is changed in units of rows of the image sensor. Accordingly, as shown in FIG. 1(C), the value of the flicker component g(t, E) differs according to the exposure end timing T of each row.

Figure 2:
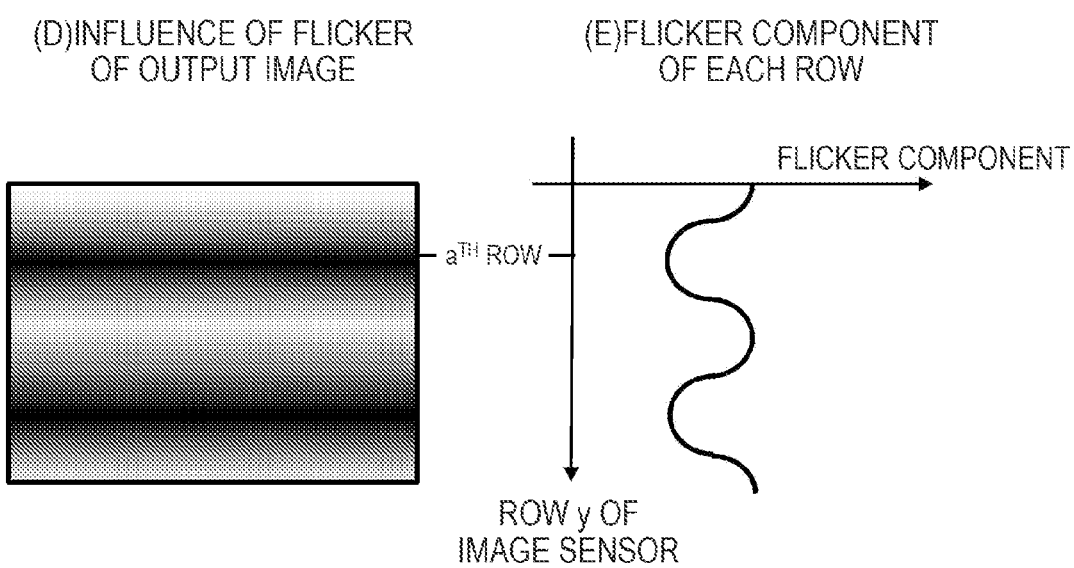
FIGS. 2(D) and 2(E) are diagrams illustrating the flicker occurrence principle and correction.

FIG. 2(D) is a schematic diagram illustrating the influence of the flicker occurring in an output image of the image sensor influenced by the flicker. Since the exposure end timing differs for each row, a bright and dark stripe pattern in the row unit is shown in the output image.

FIG. 2(E) is a diagram illustrating a graph g(y) of the flicker component of each row y of the output image.

The relation between the row y and the exposure end time t of each row y is analyzed by a data processing unit of the imaging device (camera). For example, as shown in FIG. 1(B), each row y and the exposure end time t of each row y have a linear relation.

Specifically, for example, the exposure end time t of a $y^{th}$ row of the photographed image of an $N^{th}$ frame can be expressed as in the above expression t=a1×y+N×S+a0.

In this expression, it is assumed that a1 is an eigenvalue of the image sensor, a0 is a constant, and S is a photographing interval (see FIG. 1(B)) of each frame.

The data processing unit of the imaging device (camera) can calculate the flicker component g(t, E) corresponding to t from the graph of FIG. 1(C) based on the exposure time E and the exposure end time t of each row y at the time of photographing the image. For example, when it is assumed that t is the exposure end time of an $a^{th}$ row shown in FIGS. 2(D) and 2(E), the flicker component g(t, E) corresponding to t from the graph of FIG. 1(C) can be calculated.

When the flicker component g(t, E) of the pixel at the exposure end time t of the exposure time E in the image sensor is known, a flicker component g(y) of each row of the image sensor can be estimated.

Figure 3:
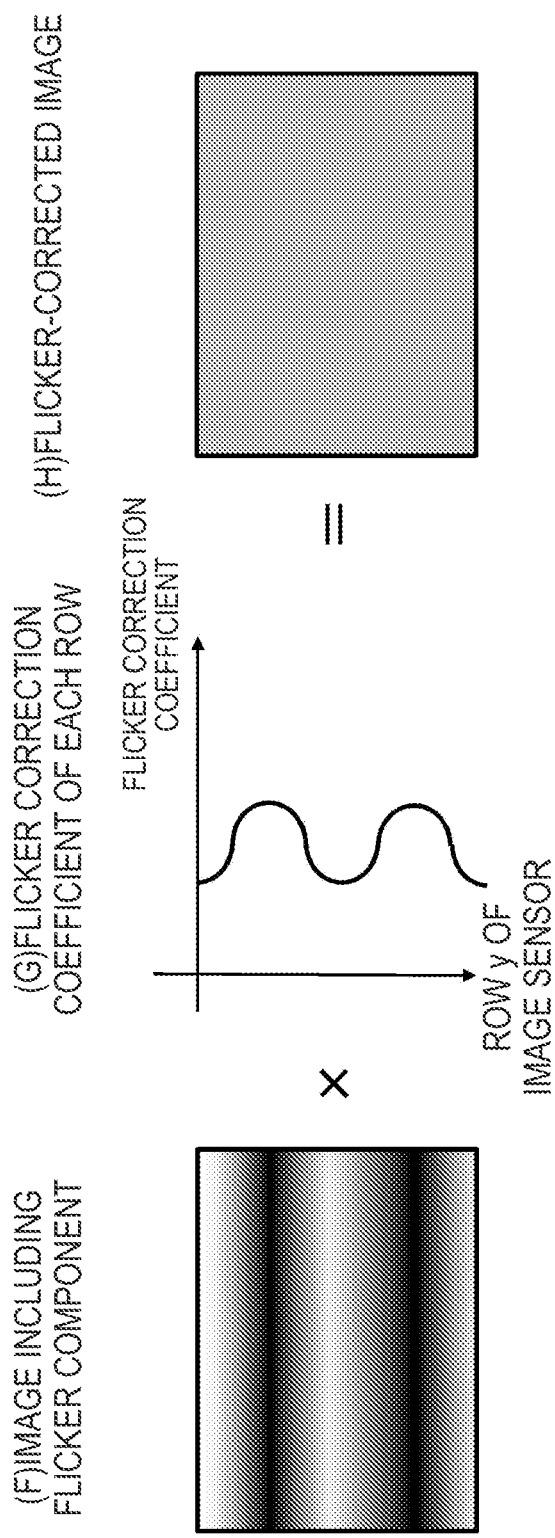
FIGS. 3(F) to 3(H) are diagrams illustrating the flicker occurrence principle and correction.

FIGS. 3(F) to 3(H) are diagrams illustrating a flicker correction principle.

FIG. 3(F) illustrates an image including a flicker component (=FIG. 2(D)).

FIG. 3(G) illustrates a flicker correction coefficient (the reciprocal of FIG. 2(E)).

FIG. 3(H) illustrates a flicker-corrected image (=FIG. 3(G)×FIG. 3(H)).

For example, an ideal image having no flicker shown in FIG. 3(H) can be obtained by measuring the flicker component g(y) of each row according to the above-described method and multiplying each pixel value of an observation image shown in FIG. 3(F), that is, the image photographed by the camera, by multiplying by the reciprocal of the flicker component g(y) shown in FIG. 3(G). Further, Japanese Unexamined Patent Application Publication No. 2011-160090 described above discloses an actual measurement method of measuring a flicker component in detail. Therefore, the image processing device according to the embodiment of the present disclosure can perform a process of extracting the flicker component of the image through the same process as the process disclosed in Japanese Unexamined Patent Application Publication No. 2011-160090.

[2. Overview of Process Performed by Image Processing Device According to Embodiments of the Present Disclosure]

In order to generate a wide dynamic range image, for example, the image processing device according to the embodiment of the present disclosure receives an input a plurality of photographed images in which different exposure times are set, generates a corrected image from which a flicker component is removed or reduced, and outputs the corrected image.

For example, the image processing device according to the embodiment of the present disclosure combines the plurality of photographed images in which the different exposure times are set, generates the wide dynamic range image in which more accurate pixel values are set from a low luminance portion to a high luminance portion, and outputs the wide dynamic range image.

The image processing device according to the embodiment of the present disclosure does not perform a process of individually calculating a flicker component of the plurality of photographed images in which the different exposure times are set. A process of calculating the flicker component is performed only on a photographed image of one exposure time and a process of estimating the flicker component included in a photographed image in which another exposure time is set is performed using the flicker component calculated based on the photographed image of the one exposure time.

A processing example which is a point of the embodiment of the present disclosure will be described with reference to FIGS. 4A to 4C and the subsequent drawings.

The processing example to be described with reference to FIGS. 4A to 4C and the subsequent drawings is a processing example in which the flicker component included in a photographed image of an exposure time 2E is estimated using the flicker component calculated from a photographed image of an exposure time E.

Figure 4:
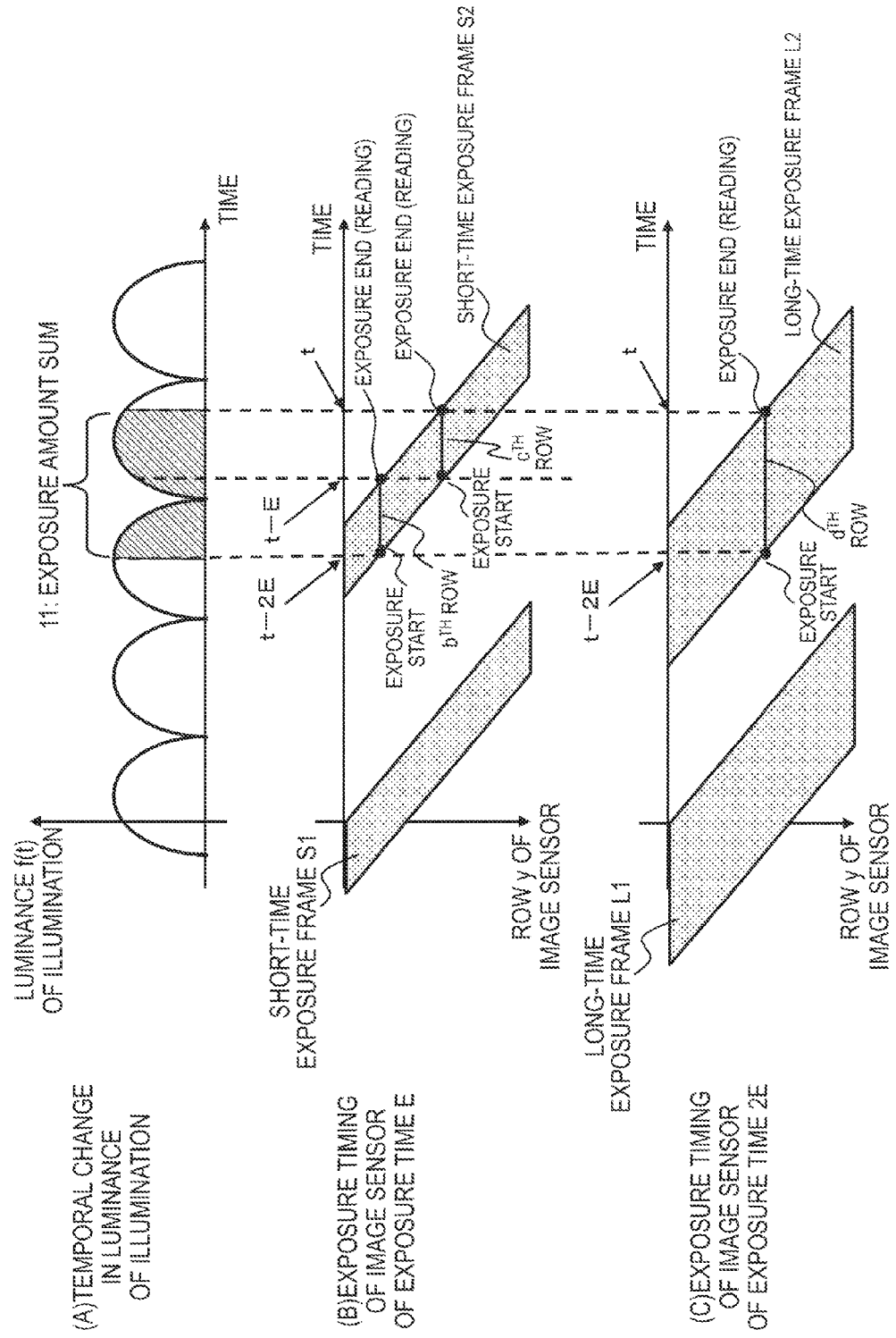
FIGS. 4(A) to 4(C) are diagrams illustrating flicker correction performed by an image processing apparatus according to an embodiment of the present disclosure.

FIG. 4(A) is a diagram illustrating a temporal transition [a diagram illustrating a relation between a time (t) and illumination light luminance f(t)] of a change in the luminance of illumination.

FIG. 4(B) is a diagram illustrating an exposure timing [a diagram illustrating a relation between the time (t) and an exposure timing of each row of the image sensor] of an image sensor (first image sensor) of the exposure time E.

FIG. 4(C) is a diagram illustrating an exposure timing [a diagram illustrating a relation between the time (t) and an exposure timing of each row of the image sensor] of an image sensor (second image sensor) of an exposure time 2E.

It is assumed that t is an exposure end time (read start time) of the pixels of a $d^{th}$ row in a long-time exposure frame L2 of the second image sensor of the exposure time 2E shown in FIG. 4(C).

It is assumed that t is likewise an exposure end time of the pixels of a $c^{th}$ row in a short-time exposure frame S2 of the first image sensor of the exposure time E shown in FIG. 4(B) and a time (t−E) is an exposure end time of the pixels of a $b^{th}$ row.

In the long-time exposure frame L2 of the second image sensor of the exposure time 2E shown in FIG. 4(C), a sum of the illumination light, that is, an exposure amount sum during exposure of the $d^{th}$ row, is an exposure amount sum 11 indicated by diagonal lines of FIG. 4(A).

The exposure amount sum 11 is the same as an addition value of the exposure amount sum of the $b^{th}$ row and the exposure amount sum of the $c^{th}$ row in the first image sensor.

Thus, the exposure amount sum of a given row of the second image sensor of the exposure time 2E can be described as a linear sum of the exposure amount sums of a plurality of rows of the first image sensor of the exposure time E. For example, the flicker component of a second image of the second exposure time 2E is estimated using this relation from the flicker component of a first image of the first exposure time E.

Hereinafter, a formulated method of obtaining a flicker component occurring in an image of another exposure time from a flicker component of an image (reference image) of one exposure time will be described based on this theorem.

As described above, the flicker component g(t, E) of a pixel of an exposure time E in which the exposure end time is t can be described as in the following equation (Equation 2).

$$g(t, E) = \frac{Ef_D + \int_{t-E}^{t} f_A(t)dt}{Ef_D} \qquad \text{(Equation 2)}$$

At this time, the flicker component g(t, 2E) of a pixel of the exposure time 2E in which the exposure end time is t can be described as in the following equation (Equation 3).

$$g(t, 2E) = \frac{2Ef_D + \int_{t-2E}^{t} f_A(t)dt}{2Ef_D} = \qquad \text{(Equation 3)}$$

$$\frac{1}{2}\left(\frac{2Ef_D + \int_{t-E}^{t} f_A(t)dt + \int_{t-2E}^{t-E} f_A(t)dt}{Ef_D}\right) =$$

$$\frac{1}{2}\left(\frac{Ef_D + \int_{t-E}^{t} f_A(t)dt}{Ef_D} + \frac{Ef_D + \int_{t-2E}^{t-E} f_A(t)dt}{Ef_D}\right)$$

$$g(t, 2E) = \frac{1}{2}\{g(t, E) + g(t-E, E)\}$$

As understood from the above equation (Equation 3), the flicker component of the $d^{th}$ row of the exposure time 2E can be calculated as a linear sum of the flicker components of the $c^{th}$ row and the $d^{th}$ row of the exposure time E. A correspondence relation between respective rows can be obtained in advance when an exposure time or a driving timing of each image sensor and the period of flicker are known in advance.

Thus, a flicker component g(t, E1) of a first exposure image is first calculated as a function of the exposure time E1 of the first exposure image and the exposure end time t of each pixel of the first exposure image.

Next, a flicker component g(t, E2) of a second exposure image of the exposure time E2 is calculated as a linear sum of the flicker component g(t, E1) of the first exposure image.

Figure 5:
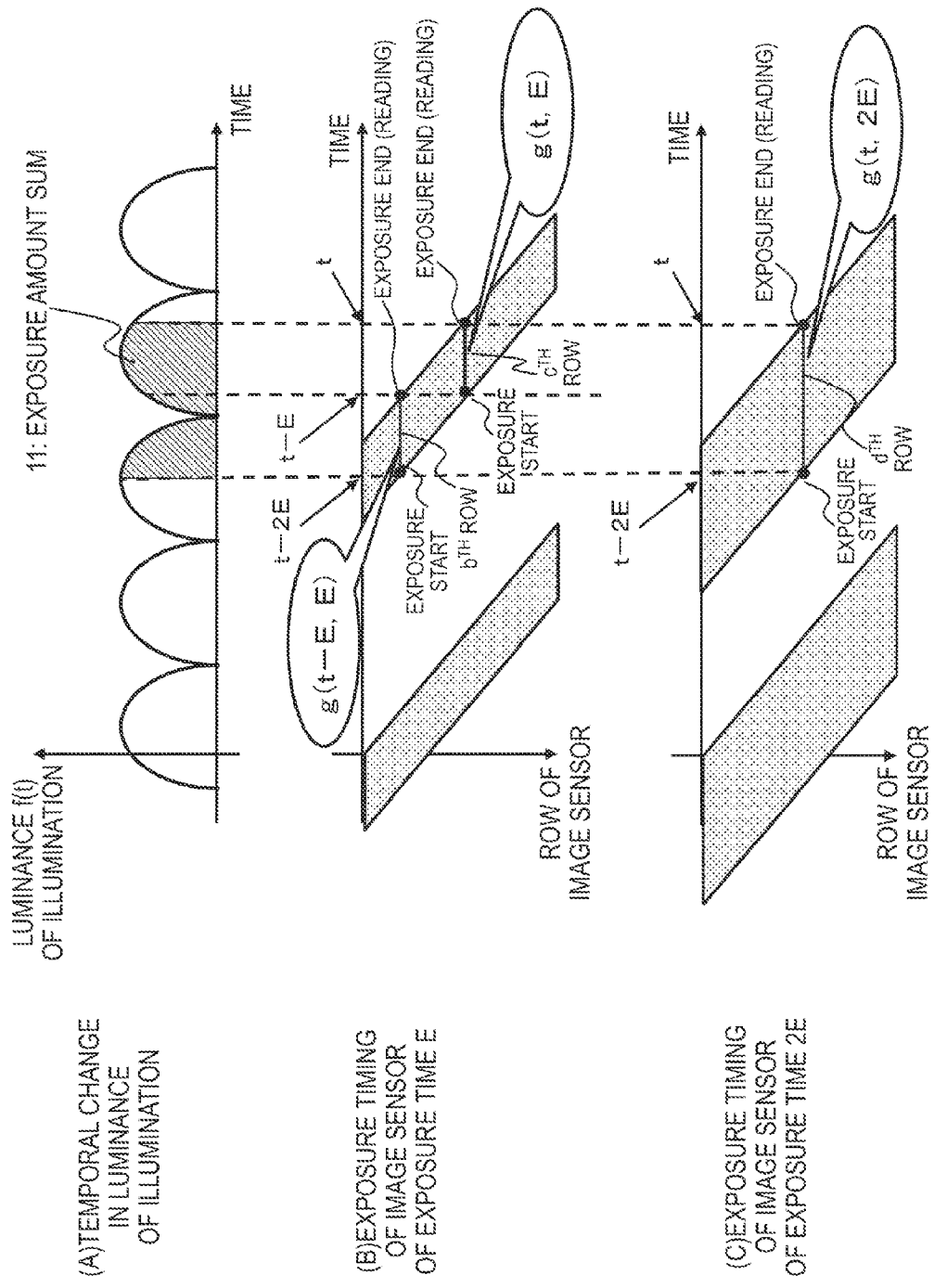
FIGS. 5(A) to 5(C) are diagrams illustrating flicker correction performed by an image processing apparatus according to an embodiment of the present disclosure.

FIGS. 5(A) to 5(B) are diagrams illustrating the correspondence between the flicker component g(t, E) of the pixels of the exposure time E calculable through the above equations (Equation 2 and Equation 3) and each exposure timing of the flicker component g(t, 2E) of the pixels of the exposure time 2E.

Thus, when the exposure time E2 of the second exposure image is twice the exposure time E1 of the first exposure image, as shown in FIGS. 5(A) to 5(C), the flicker component g(t, 2E) of the second exposure image of the exposure time E2 can be calculated as a linear sum of the flicker components g(t, E) and g(t−E, E) of the plurality of first exposure images corresponding to the different exposure end times t of the first exposure image.

Likewise, when the exposure time E2 of the second exposure image is an integer multiple of (M times) the exposure time E1 of the first exposure image, the flicker component g(t, M×E) of the second exposure image of the exposure time E2 can be calculated as a linear sum of the flicker components g(t, E), g(t−E, E), ..., and g(t−(M−1)E, E) of the plurality of first exposure images corresponding to the different exposure end times t of the first exposure image. Here, M is assumed to be a positive integer.

The above equations (Equation 2 and Equation 3) have been described as the examples corresponding to a relation of 1:2 of the exposure time E of the first image sensor to the exposure time 2E of the second image sensor.

However, for example, when the exposure ratio is not an integer multiple of one exposure ratio, such as the exposure ratio of 1:1.6, the other exposure amount may not be expressed as a linear sum of the one exposure amount.

Figure 6:
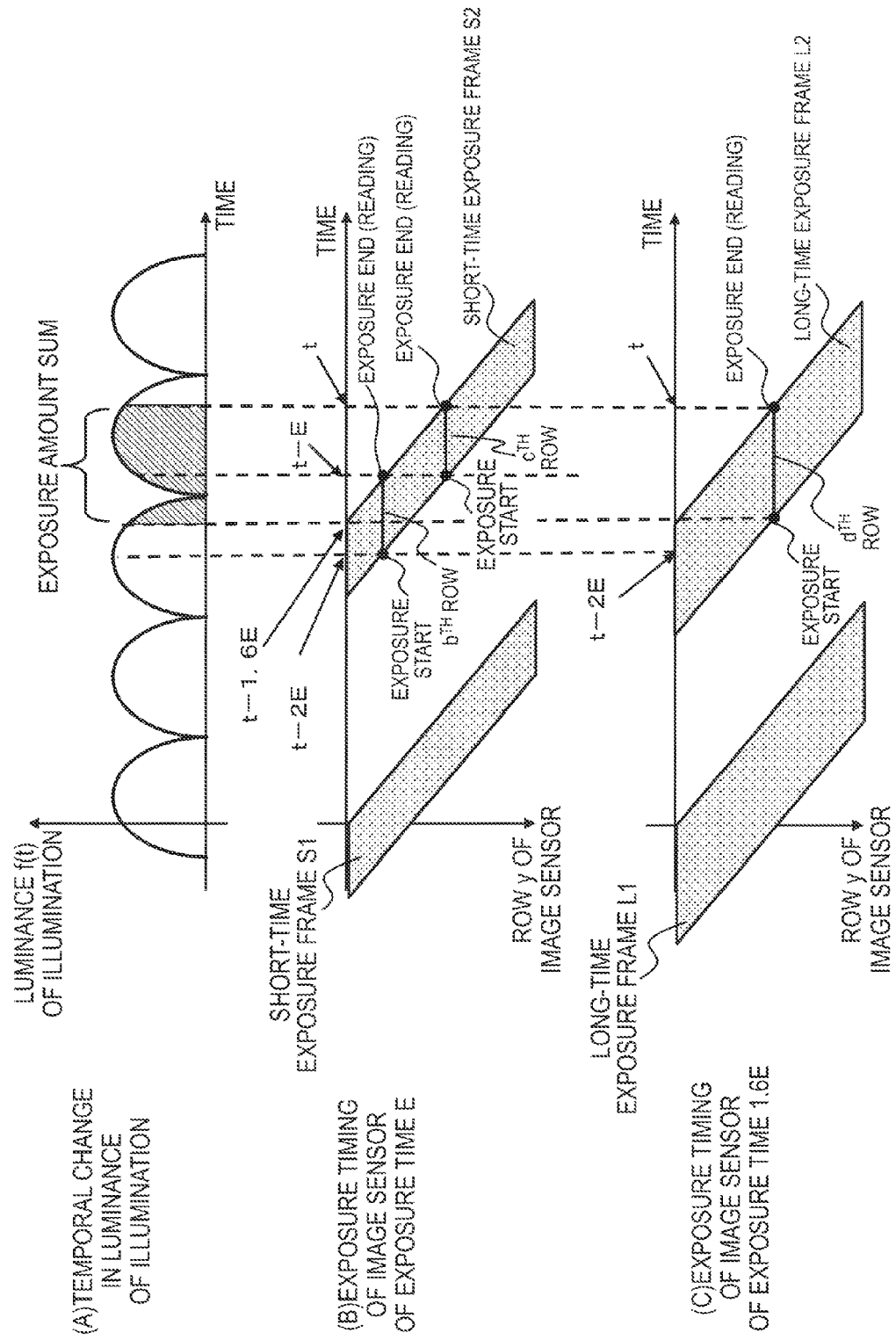
FIGS. 6(A) to 6(C) are diagrams illustrating flicker correction performed by an image processing apparatus according to an embodiment of the present disclosure.

Specifically, FIGS. 6(A) to 6(C) illustrate such setting. The exposure amount of the $d^{th}$ row of the exposure time 1.6E corresponds to the exposure amount of the $c^{th}$ row of the exposure time E and a part of the exposure amount of the $b^{th}$ row.

Thus, when there is the second image set such that the exposure ratio is not an integer multiple for the reference exposure time E corresponding to the reference image, the exposure amount of the second image may not be expressed as a linear sum of the exposure amounts of the reference image.

In this case, that is, when it is necessary to calculate the exposure amount of an exposure period kE (where k<1.0) less than an integer multiple of the reference exposure time E corresponding to the reference image in which the flicker component is calculated, approximate processing is performed on the supposition that the change amount $f_A(t)$ from the average value $f_D$ of the illumination light is smoothly changed at an exact time.

Specifically, on the assumption that E is the reference exposure time corresponding to the reference image in which the flicker component is calculated and kE (where k<1) is an exposure time less than the exposure time E, an integrated value of the change amount $f_A(t)$ from the average value $f_D$ of the illumination light in the exposure time kE (=(t−kE) to (t)) is approximated, as in the following equation (Equation 4).

$$\left(\int_{t-kE}^{t} f_A(t)dt\right) : \left(\int_{t-E}^{t} f_A(t)dt\right) \cong kE : E \qquad \text{(Equation 4)}$$

In the above equation (Equation 4), k is assumed to be a value equal to or less than 1.

The approximation expressed by the above equation (Equation 4) is approximate processing based on the supposition that a ratio of an exact period of the exposure time kE (where k<1) less than the reference exposure time E to the change amount $f_A(t)$ from the average value $f_D$ of the illumination light is almost the same as the ratio of an integration period.

For example, the integrated value of the change amount $f_A(t)$ from the average value $f_D$ of the illumination light during the exact period corresponding to the exposure time 0.6E in a setting example of the exposure ratio of 1E:1.6E can be expressed as in the following equation (Equation 5) using this approximation.

$$\int_{t-1.6E}^{t-E} f_A(t)dt \cong \frac{0.6E}{1.0E}\int_{t-2E}^{t-E} f_A(t)dt = 0.6\int_{t-2E}^{t-E} f_A(t)dt \quad \text{(Equation 5)}$$

By using the this approximate processing, a flicker component g(t, 1.6E) of the exposure time 1.6E in the setting example of the exposure ratio of 1E:1.6E can be expressed as in the following equation (Equation 6) that can be calculated based on the flicker components g(t, E) and g(t−E, E) of the reference exposure time E.

$$g(t, 1.6E) = \frac{1.6Ef_D + \int_{t-1.6E}^{t} f_A(t)dt}{1.6Ef_D}$$

$$= \frac{1}{1.6}\left(\frac{1.6Ef_D + \int_{t-E}^{t} f_A(t)dt + \int_{t-1.6E}^{t-E} f_A(t)dt}{Ef_D}\right)$$

$$\cong \frac{1}{1.6}\left(\frac{Ef_D + \int_{t-E}^{t} f_A(t)dt}{Ef_D} + \frac{0.6Ef_D + 0.6\int_{t-1.6E}^{t-E} f_A(t)dt}{Ef_D}\right)$$

$$= \frac{1}{1.6}\{g(t, E) + 0.6g(t-E, E)\}$$

(Equation 6)

Thus, even when the second exposure time of the image from which the flicker component is estimated is an exposure time which is not an integer multiple of the reference exposure time E at which the flicker component is calculated, the flicker component of the second exposure time can be calculated using the flicker component g(t, E) of the pixel of the first exposure time E serving as a reference.

That is, when the exposure time E2 of the second exposure image is not an integer multiple of the exposure time E1 of the first exposure image, the total amount of environmental light which is a cause of flicker occurrence during an exposure period kE1 (where k<1) less than the exposure time E1 of the first exposure image is approximated to k times the total amount of the environmental light within the exposure time E1. Then, based on this approximation, the flicker component g(t, E2) of the second exposure image of the exposure time E2 can be calculated as a linear sum of the flicker components g(t, E1) of the first exposure image.

[3. Configuration and Process of Image Processing Device According to First Embodiment of the Present Disclosure]

Figure 7:
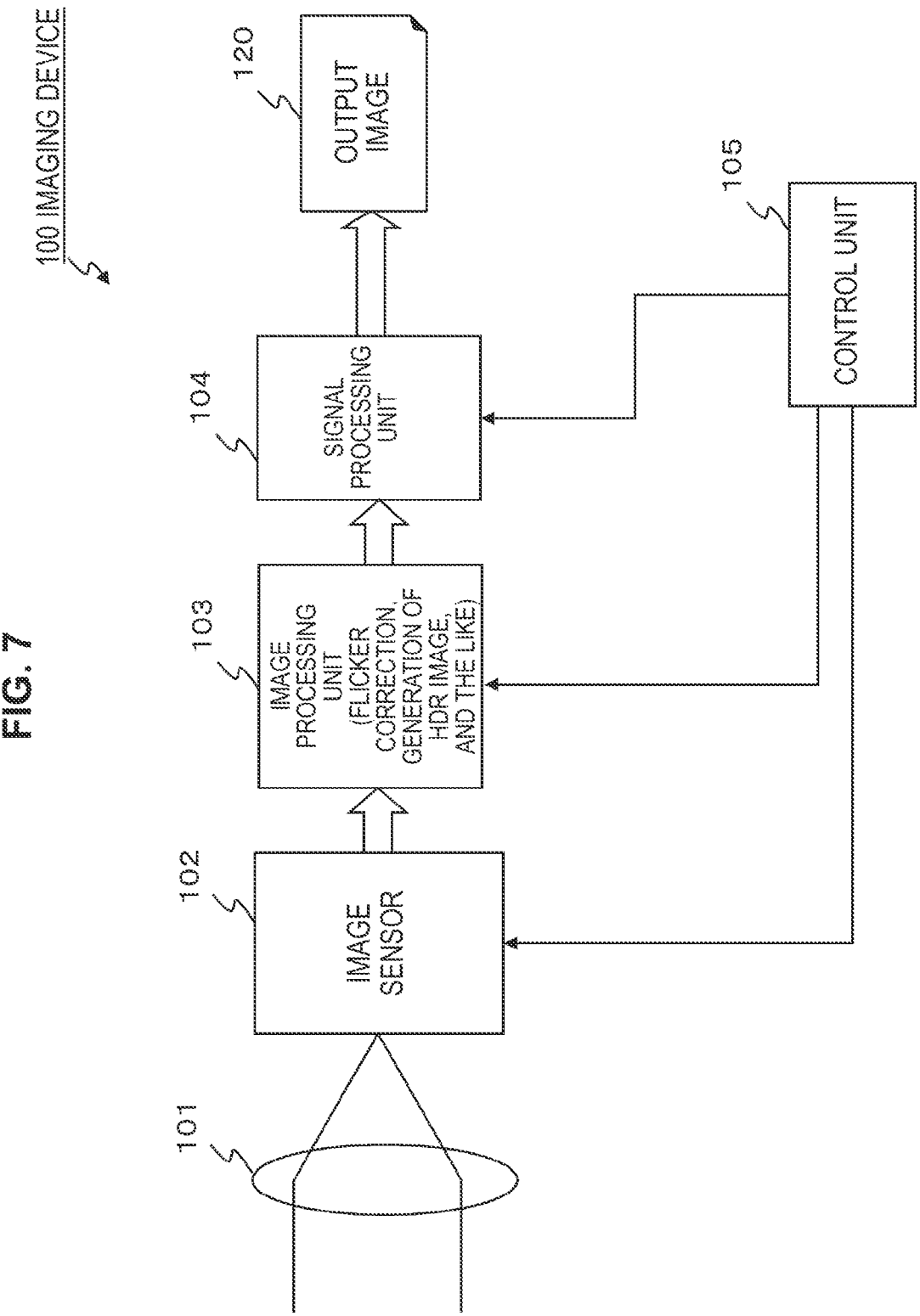
FIG. 7 is a diagram illustrating one example of the configuration of an image processing device according to an embodiment of the present disclosure.

FIG. 7 is a diagram illustrating an example of the configuration of an imaging device 100 as one example of the configuration of an image processing device according to a first embodiment of the present disclosure.

FIG. 7 is a block diagram illustrating the example of the configuration of the imaging device. Light incident via an optical lens 101 is incident on an imaging unit such as an image sensor 102 including, for example, a CMOS image sensor, and thus image data obtained through photoelectric conversion is output. The output image data is input to an image processing unit 103.

An output image of the image sensor 102 is a so-called mosaic image in which a pixel value of one of RGB is set in each pixel.

The image processing unit 103 performs, for example, the above-described flicker correction process and a process of generating a wide dynamic range (high dynamic range: HDR) image based on a combining process of combining a long-time exposure image and a short-time exposure image.

The output of the image processing unit 103 is input to a signal processing unit 104. The signal processing unit 104 performs signal processing of a general camera such as white balance (WB) adjustment and gamma adjustment and generates an output image 120. The output image 120 is stored in a storage unit (not shown) or is output to a display unit.

For example, a control unit 105 outputs a control signal to each unit according to a program stored in a memory (not shown) and performs various kinds of processes.

[4. Example of Exposure Control Configuration of Image Sensor in Image Processing Device According to First Embodiment]

Next, an example of the exposure control configuration of the image sensor 102 will be described with reference to FIG. 8.

The image processing device according to the embodiment of the present disclosure sets long-time exposure pixels and short-time exposure pixels in a pixel unit included in one photographed image and generates a wide dynamic range (high dynamic range: HDR) image through a combining process (α blend) on the pixels. The exposure time control is performed under the control of the control unit 105.

FIG. 8 is a diagram illustrating an example of exposure time setting of the image sensor 102 according to an embodiment of the present disclosure.

As shown in FIG. 8, the constituent pixels of the image sensor are classified into two kinds of pixels:

pixels in which a first exposure condition (short-time exposure) is set; and pixels in which a second exposure condition (long-time exposure) is set.

A pixel array that has pixels of different exposure times such as the short-time exposure pixels and the long-time exposure pixels in one image sensor as in FIG. 8 is called a spatial varying exposure (SVE) array.

Figure 9:
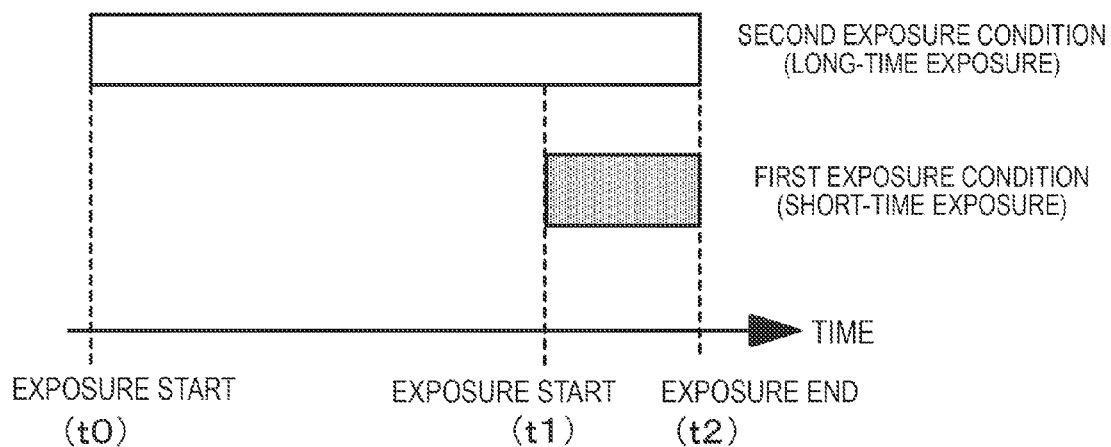
FIG. 9 is a diagram illustrating the exposure control process of an image sensor.

FIG. 9 is a diagram illustrating a setting example of the exposure time of each pixel.

A pixel in which the first exposure condition (short-time exposure) is set is subjected to a short-time exposure process.

A pixel in which the second exposure condition (long-time exposure) is set is subjected to a long-time exposure process.

The exposure control of the pixel unit is performed, for example, when the control unit 105 of the imaging device 100 shown in FIG. 7 outputs a control signal to the image sensor 102.

[5. Details of Image Processing Unit in Image Processing Device According to First Embodiment]

Next, the image processing unit 103 of the imaging device 100 shown in FIG. 7 will be described in detail.

A process performed by the image processing unit 103 will be first described with reference to FIG. 10.

Figure 10:
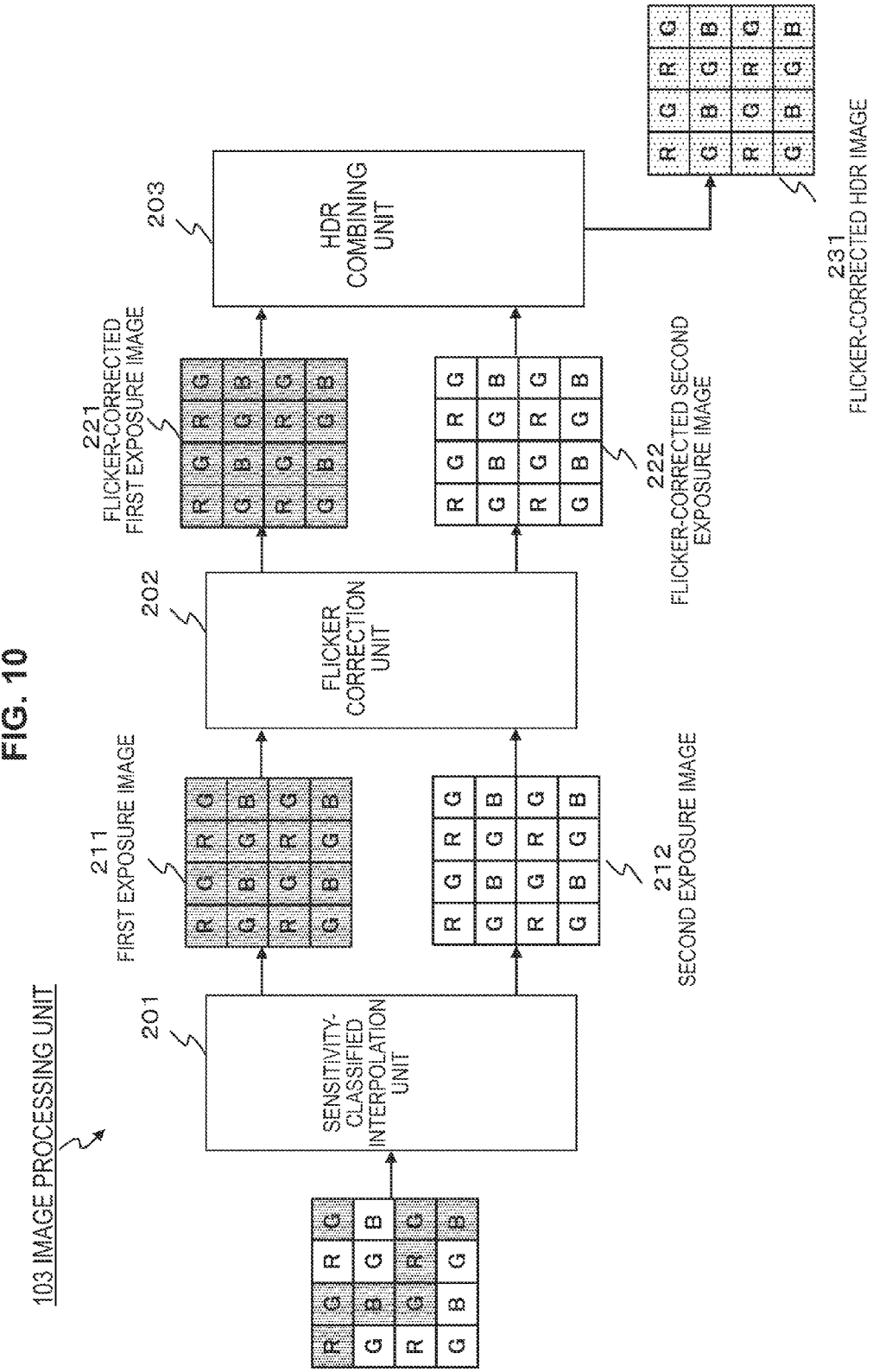
FIG. 10 is a diagram illustrating the configuration and a process of an image processing unit of the image processing apparatus according to an embodiment of the present disclosure.

As shown in FIG. 10, the image processing unit 103 includes a sensitivity-classified interpolation unit 201, a flicker correction unit 202, and an HDR combining unit (wide dynamic range image combining unit) 203.

The sensitivity-classified interpolation unit 201 receives an input of an image of a spatially varying exposure (SVE) array that has short-time exposure pixels and long-time exposure pixels within one image sensor, as shown in FIG. 8, generates a first exposure image 211 of the short-time exposure on the entire screen and a second exposure image 212 of the long-time exposure on the entire screen, and outputs the first exposure image 211 and the second exposure image 212.

The color array of the output image may be the same as the color array (in this example, a Bayer array) of the input image or may be an image which is obtained after de-mosaic and thus has the RGB at one pixel position.

Here, an example will be described on the assumption that the color array of the output image is the same as the color array (in this example, a Bayer array) of the input image.

Figure 11:
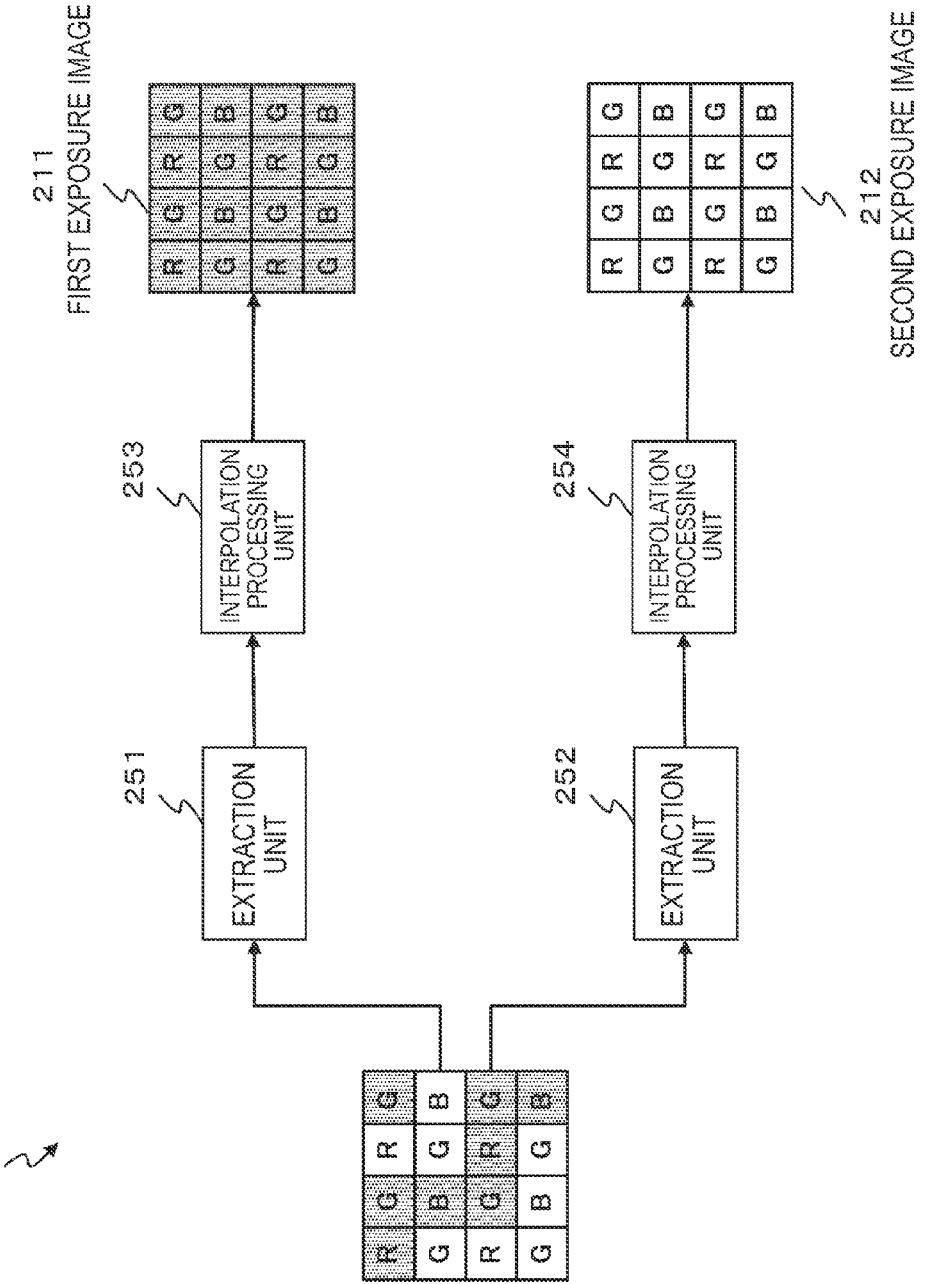
FIG. 11 is a diagram illustrating the configuration and a process of a sensitivity-classified interpolation unit.

FIG. 11 is a diagram illustrating an example of the detailed configuration of the sensitivity-classified interpolation unit 201.

As shown in FIG. 11, the sensitivity-classified interpolation unit 201 includes extraction units 251 and 252 that extract only the short-time exposure pixel or the long-time exposure pixel, and the pixels of one sensitivity. The sensitivity-classified interpolation unit 201 further includes interpolation processing units 253 and 254 that set a pixel value of another sensitivity pixel portion using the pixel of each sensitivity and generate a first exposure image 211 including low-sensitivity pixels (short-time exposure pixels) and a second exposure image 212 including high-sensitivity (long-time exposure pixels).

As an interpolation processing configuration corresponding the sensitivity, for example, a configuration of FIG. 84 described in Japanese Unexamined Patent Application Publication No. 2008-125117 can be applied.

The extraction units 251 and 252 extract the pixels of the sensitivity and a color desired to be interpolated from peripheral pixels and the interpolation processing units 253 and 254 perform an interpolation process.

As an interpolation method, for example, a method of using a simple LPF for the pixel value of the sensitivity according to a generated image can be used. Alternatively, for example, a method of estimating an edge direction of an image from periphery pixels and interpolating a pixel value in the edge direction as a reference pixel value can be used.

The sensitivity-classified interpolation unit 201 receives an input of an image of a spatially varying exposure (SVE) array including the long-time exposure pixels and the short-time exposure pixels within the same image sensor, as shown in FIG. 8, generates the first exposure image 211 of the short-time exposure on the entire screen and the second exposure image 212 of the long-time exposure on the entire screen, and outputs the first exposure image 211 and the second exposure image 212 by applying the configuration of FIG. 11.

Next, the configuration and a process of the flicker correction unit 202 will be described with reference to FIG. 12.

Figure 12:
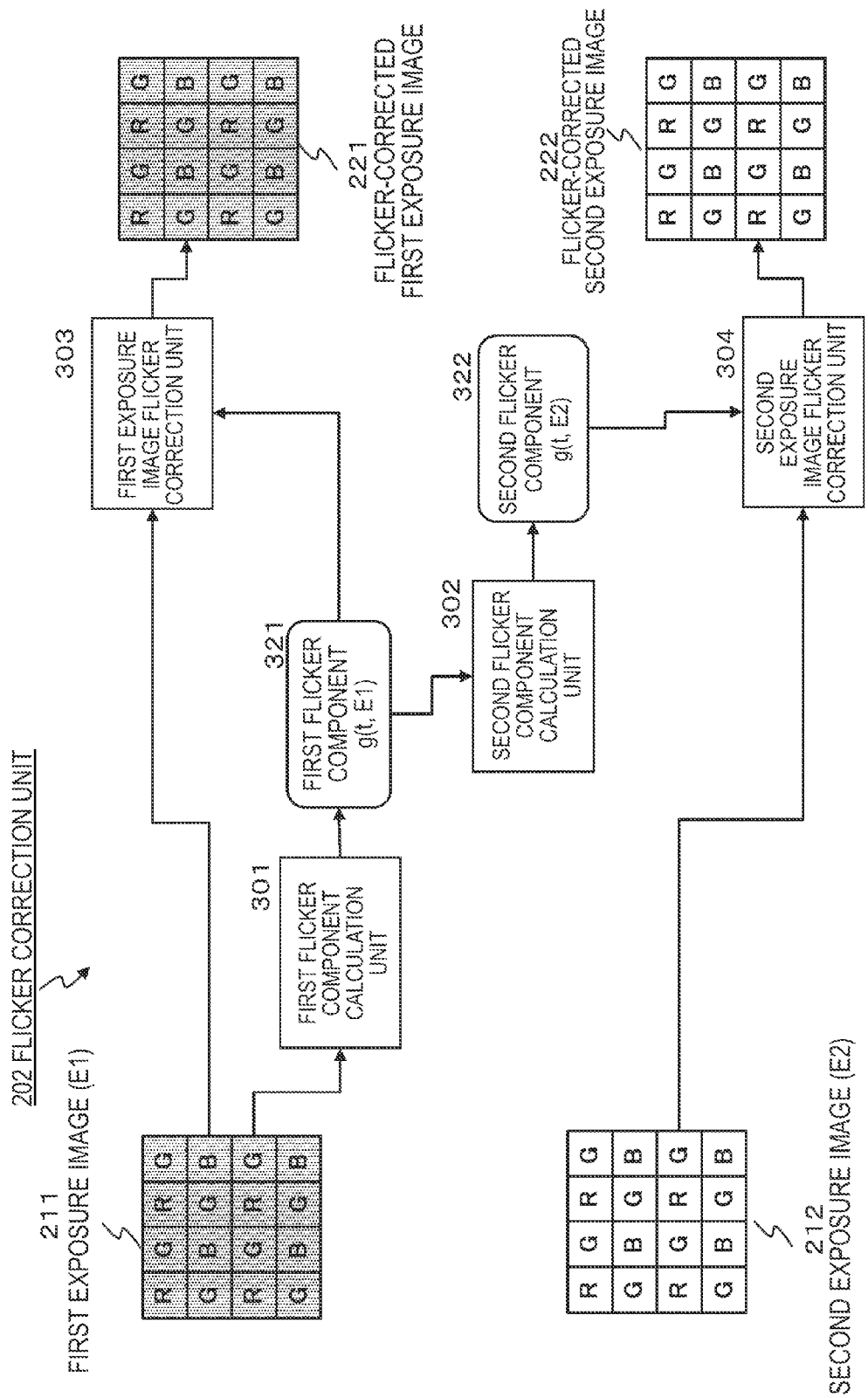
FIG. 12 is a diagram illustrating the configuration and a process of a flicker correction unit.

As shown in FIG. 12, the flicker correction unit 202 is configured to include a first flicker component calculation unit 301, a second flicker component calculation unit 302, a first exposure image flicker correction unit 303, and a second exposure image flicker correction unit 304.

Images input to the flicker correction unit 202 are two images below generated by the sensitivity-classified interpolation unit 201:

(a) the first exposure image 211 of the short-time exposure on the entire screen; and (b) the second exposure image 212 of the long-time exposure on the entire screen.

For example, the first exposure image 211 is an image of an exposure time E1 and the second exposure image 212 is an image of an exposure time E2. The exposure times E1 and E2 have the above-described relation of E1<E2.

In this embodiment, by using the first exposure image 211 of the short-time exposure as a reference image used to calculate the flicker component from the first exposure image 211, a process of estimating the flicker component of the second exposure image 212 of the long-time exposure from the flicker component of the reference image is performed.

First, the first flicker component calculation unit 301 receives an input of the first exposure image 211 of the short-time exposure on the entire screen as a reference image and calculates a first flicker component 321 included in the short-time exposure image.

A process of calculating the flicker component is performed according to the method disclosed in, for example, Japanese Unexamined Patent Application Publication No. 2011-160090.

The "flicker component" of the first exposure image 211 calculated by the first flicker component calculation unit 301 is the "flicker component" described above with reference to Equation 1 and Equation 2, is a ratio of the ideal image with no flicker to an image influenced by the flicker, and is the same as the ratio of the total amount of the illumination light during the accumulation of the pixels.

The flicker component $g(t, E)$ of the pixel at the exposure end time t of the exposure time E in the image sensor becomes the value obtained by Equation 1 and Equation 2 described above.

When the first exposure image 211 is set as the image of the exposure time E1, the first flicker component calculation unit 301 calculates the flicker component $g(t, E1)$ as the first flicker component 321 of the first exposure image 211 using the method disclosed in, for example, Japanese Unexamined Patent Application Publication No. 2011-160090.

The value of the flicker component differs for each row of the image with the different exposure end time t.

The second flicker component calculation unit 302 receives an input of the first flicker component 321 of the first exposure image 211 which is the reference image calculated by the first flicker component calculation unit 301, that is, the short-time exposure image, and calculates the second flicker component 322 which is a flicker component of the second exposure image 212 using an exposure ratio of the first exposure image 211 to the second exposure image 212, for example, E1:E2.

The process of calculating the second flicker component 322 in the second flicker component calculation unit 302 is a process performed according to the process described above with reference to FIGS. 4(A) to 4(C) and 5(A) to 5(C).

That is, the second flicker component $g(t, E2)$ is calculated as a linear sum of the first flicker component $g(t, E1)$, as in Equation 3 to Equation 6 described above.

When the second exposure image 212 is set to the image of the exposure time E2, the second flicker component calculation unit 302 calculates the second flicker component 322 [$g(t, E2)$] of the second exposure image 211 according to Equation 3 to Equation 6 described above.

The value of the flicker component differs for each row of the image with the different exposure end time t.

The first exposure image flicker correction unit 303 receives an input of the first exposure image 211 and the first flicker component 321 calculated by the first flicker component calculation unit 301.

The first exposure image flicker correction unit 303 generates and outputs the flicker-corrected first exposure image 221 from which the flicker component of the first exposure image 211 is removed by multiplying the constituent pixel value of the first exposure image 211 by the reciprocal of the first flicker component 321 calculated by the first flicker component calculation unit 301.

The flicker correction process is the process described above with reference to FIGS. 3(F) to 3(H) and the like. The first exposure image flicker correction unit 303 calculates the correction pixel value by multiplying the pixel value of each corresponding row by the reciprocal of the flicker component calculated in each row unit and outputs the image with the correction pixel value as the flicker-corrected first exposure image 221.

Likewise, the second exposure image flicker correction unit 304 receives an input of the second exposure image 212 and the second flicker component 322 calculated by the second flicker component calculation unit 302.

The second exposure image flicker correction unit 304 generates and outputs the flicker-corrected second exposure image 222 from which the flicker component of the second exposure image 212 is removed by multiplying the constituent pixel value of the second exposure image 212 by the reciprocal of the second flicker component 322 calculated by the second flicker component calculation unit 302.

The flicker correction process is the process described above with reference to FIGS. 3(F) to 3(H) and the like. The second exposure image flicker correction unit 304 calculates the correction pixel value by multiplying the pixel value of each corresponding row by the reciprocal of the flicker component calculated in each row unit and outputs the image with the correction pixel value as the flicker-corrected second exposure image 222.

Thus, the image processing device according to this embodiment calculates the first flicker component corresponding to the image of one exposure time without performing the process of individually calculating the plurality of different flicker components and calculates the flicker component estimated to occur in the image of another exposure time based on the first flicker component.

Since necessary processes can be considerably reduced through this process, reduction in hardware cost or the processing time is realized.

Next, the configuration and a process of the HDR combining unit (wide dynamic range image combining unit) 203 will be described with reference to FIG. 13.

Figure 13:
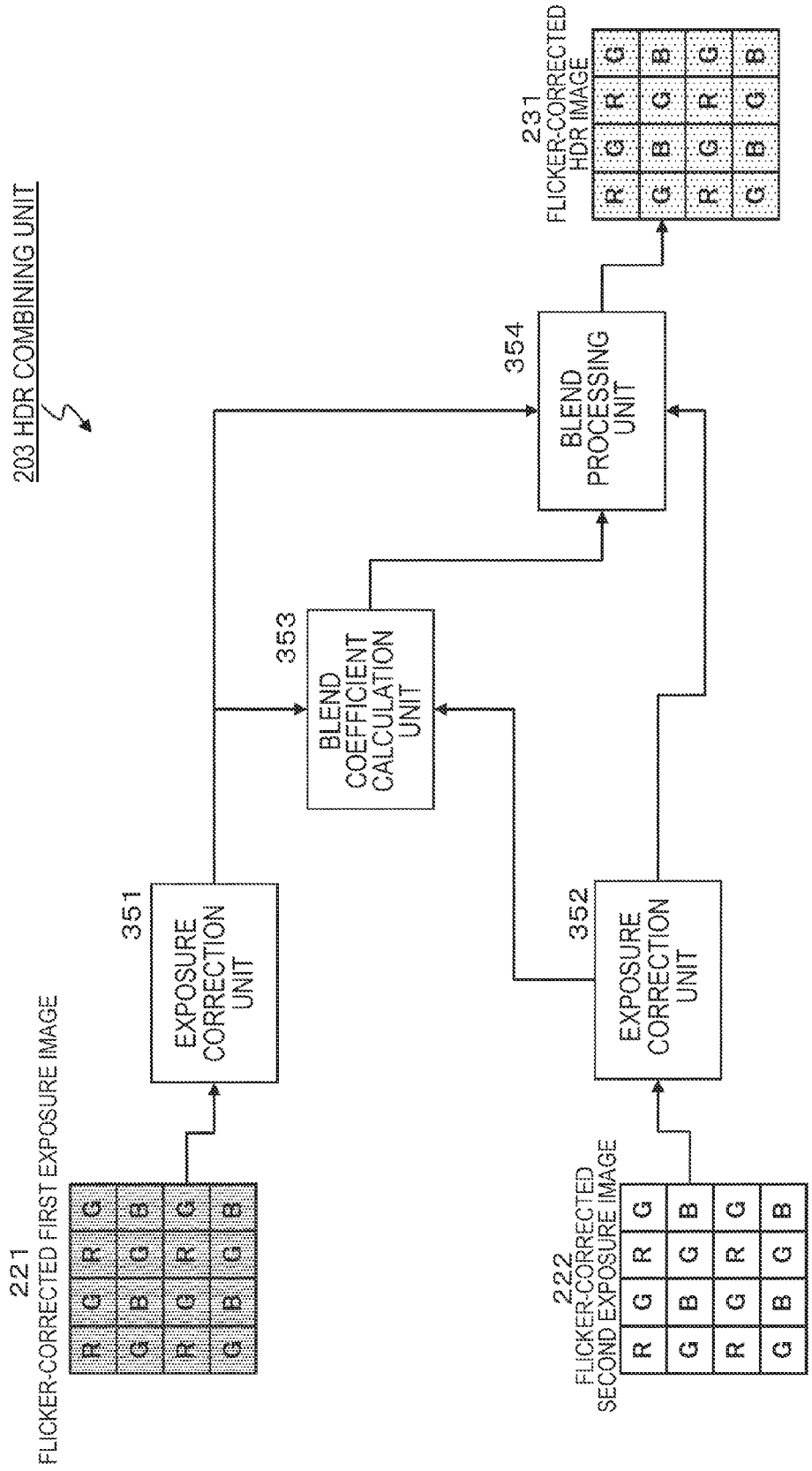
FIG. 13 is a diagram illustrating the configuration and a process of an HDR combining unit (wide dynamic range image combining unit)

As shown in FIG. 13, the HDR combining unit (wide dynamic range image combining unit) 203 includes exposure correction units 351 and 352, a blend coefficient calculation unit 353, and a blend processing unit 354.

The exposure correction units 351 and 352 match brightness of corresponding pixels of the flicker-corrected first exposure image 221 and the flicker-corrected second exposure image 222 by multiplying by a constant according to the exposure time. For example, when the exposure ratio is 1:2, the pixel value of the flicker-corrected first exposure image 221 which is the short-time exposure image is multiplied by 2, and the pixel value of the flicker-corrected second exposure image 222 which is the long-time exposure image is multiplied by 1.

The blend coefficient calculation unit 353 calculates a blend coefficient indicating a blend ratio of the pixel value of the flicker-corrected first exposure image 221, which is the short-time exposure image, subjected to the flicker correction to the pixel value of the flicker-corrected second exposure image 222, which is the long-time exposure image, subjected to the exposure correction in each corresponding pixel unit.

In the calculation of the blend coefficient, for example, the blend coefficient is set such that a large weight of the pixel value of the short-time exposure image is set in a high-luminance region and a large weight of the pixel value of the long-time exposure image is set in a low-luminance region.

The pixel values from the low-luminance region to the high-luminance region can be expressed with higher accuracy through the coefficient setting process.

The blend processing unit 354 sets each pixel value of a flicker-corrected HDR image 231 by performing the blend process of blending the corresponding pixel values of the flicker-corrected first exposure image 221 subjected to the exposure correction and the flicker-corrected second exposure image 222 subjected to the exposure correction according to the blend coefficient calculated by the blend coefficient calculation unit 353.

On the assumption that S is the pixel value of the flicker-corrected first exposure image 221 subjected to the exposure correction, L is the pixel value of the flicker-corrected second exposure image 222 subjected to the exposure correction, and $\alpha$ (where $0 \le \alpha \le 1$) is the blend coefficient, a pixel value H of the flicker-corrected HDR image 231 is calculated by the following equation:

$$H = (1-\alpha) \times S + \alpha \times L.$$

The HDR combining unit (wide dynamic range image combining unit) 203 generates and outputs the flicker-corrected HDR image 231 in which the pixel values from the low-luminance region to the high-luminance region are expressed with high accuracy through the process.

The HDR image is generated through a combining process of combining the images with different exposure times by the HDR combining unit (wide dynamic range image combining unit) 203. That is, for example, the blend process is performed by setting the large weight of the pixel value of the short-time exposure image in the high-luminance region and setting the large weight of the pixel value of the long-time exposure image in the low-luminance region, and thus the HDR (wide-dynamic range) image in which the pixel values from the low-luminance region to the high-luminance region are expressed with higher accuracy is generated and output.

As described above, the image processing device according to the embodiment of the present disclosure, which is configured to generate a wide dynamic range (HDR) image by inputting the image with the plurality of different exposure times, calculates only the flicker component corresponding to one reference exposure image, and estimates and calculates the flicker components of the image with the different exposure times according to the flicker component of the reference exposure image. Thus, since it is not necessary to perform the process of individually calculating the flicker component for each image according each exposure time, the efficient process is realized.

[6. Configuration and Process of Image Processing Device According to Second Embodiment of the Present Disclosure]

Next, the configuration and a process of an image processing device according to a second embodiment of the present disclosure will be described.

In the above-described embodiment, the example in which two exposure times of the short-time exposure and the long-time exposure are set as the setting of the exposure times has been described. However, the process according to the embodiment of the present disclosure can be also applied to a process in which images of three or more different exposure times are input.

The image processing device according to the second embodiment to be described below can be configured as the imaging device 100 having the configuration shown in FIG. 7, as in the above-described embodiment.

Figure 14:
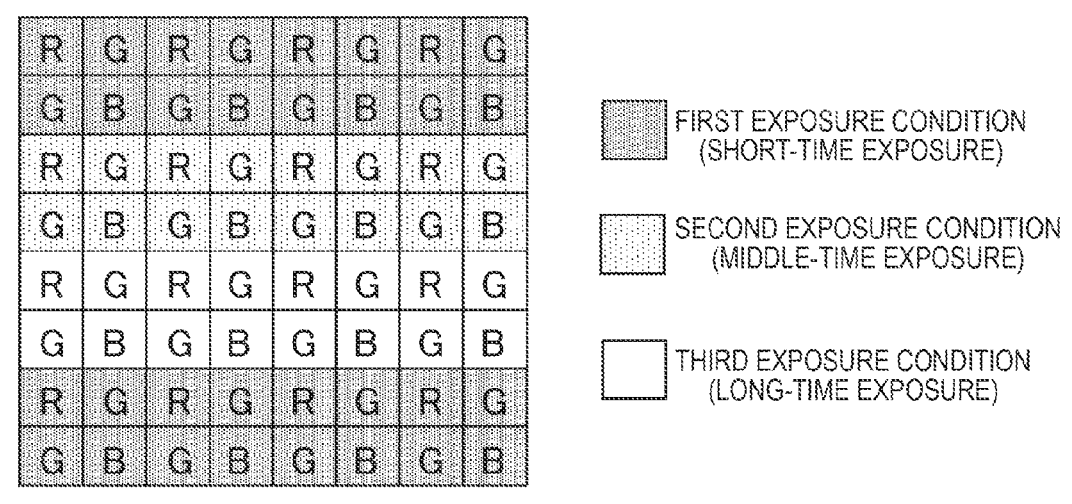

Here, the image sensor 102 is configured to include pixels in which three different exposure times shown in FIG. 14 are set.

FIG. 14 is a diagram illustrating a setting example of the exposure times of the image sensor 102 according to this embodiment.

As shown in FIG. 14, the constituent pixels of the image sensor are classified into three kinds of pixels:

a pixel in which a first exposure condition (short-time exposure) is set;

a pixel in which a second exposure condition (middle-time exposure) is set; and a pixel in which a third exposure condition (long-time exposure) is set.

The lengths of the exposure times have the following relation:

the short-time exposure<the middle-time exposure<the long-time exposure.

The exposure control of the pixel unit is performed, for example, when the control unit 105 of the imaging device 100 shown in FIG. 7 outputs a control signal to the image sensor 102.

Figure 15:
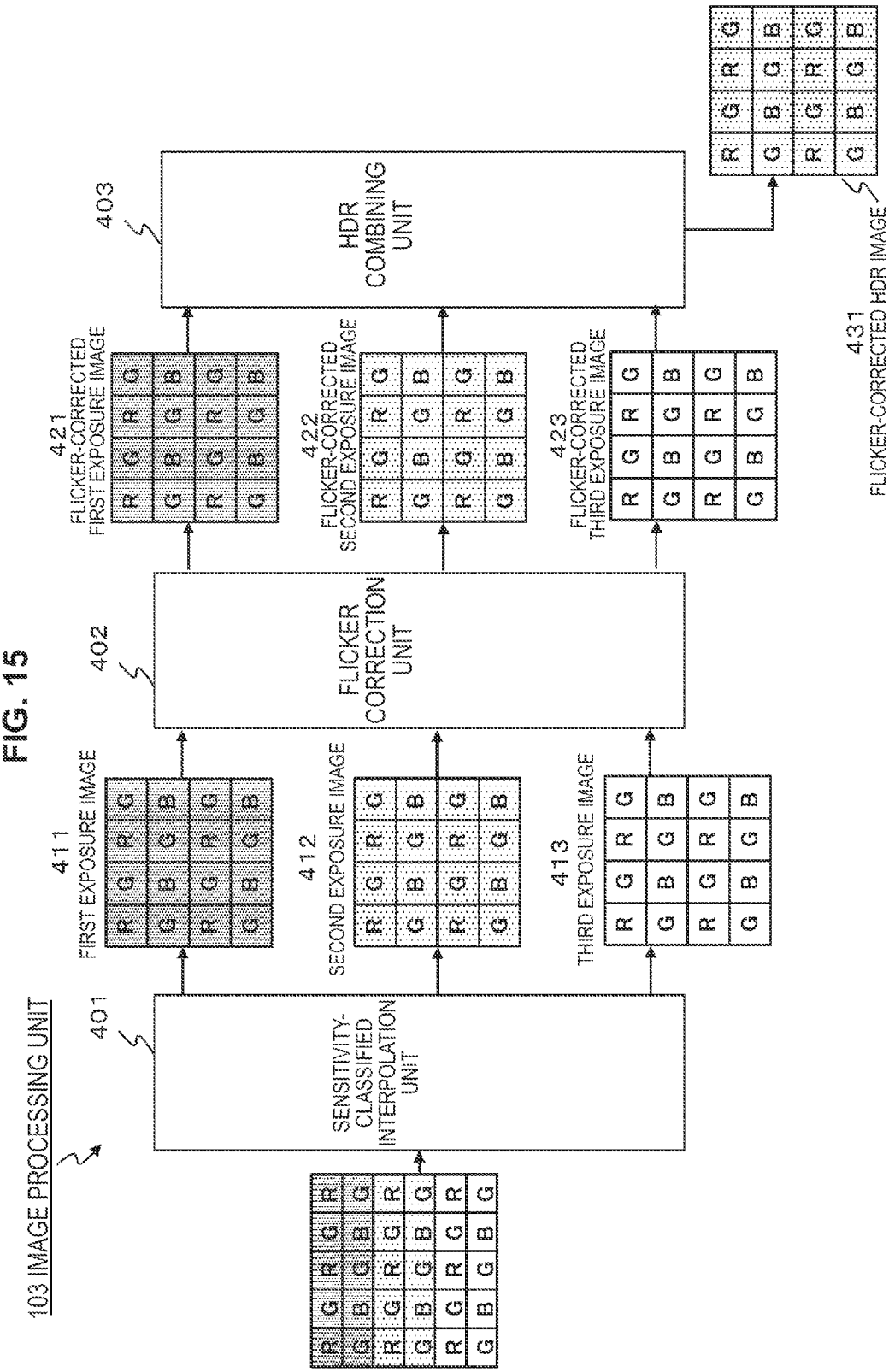
FIG. 15 is a diagram illustrating the configuration and a process of an image processing unit of the image processing apparatus according to an embodiment of the present disclosure.

An example of the configuration of the image processing unit 103 according to this embodiment is shown in FIG. 15.

As shown in FIG. 15, the image processing unit 103 includes a sensitivity-classified interpolation unit 401, a flicker correction unit 402, and an HDR combining unit (wide dynamic range image combining unit) 403.

The sensitivity-classified interpolation unit 401 receives an input of an image with a spatially varying exposure (SVE) array that has the short-time exposure pixels, middle-time exposure pixels, and long-time exposure pixels t, as shown in FIG. 14, generates a first exposure image 411 of the short-time exposure on the entire screen, a second exposure image 412 of the middle-time exposure on the entire screen, and a third exposure image 413 of the long-time exposure on the entire screen, and outputs the first exposure image 411, the second exposure image 412, and the third exposure image 413.

The sensitivity-classified interpolation unit 401 performs the same process as the process described above in the first embodiment with reference to FIG. 11 and generates each sensitivity-classified image. In this processing example, however, three sensitivity-classified images, that is, the first to third exposure images 411 to 413 are generated.

Next, the configuration and a process of the flicker correction unit 402 will be described with reference to FIG. 16.

Figure 16:
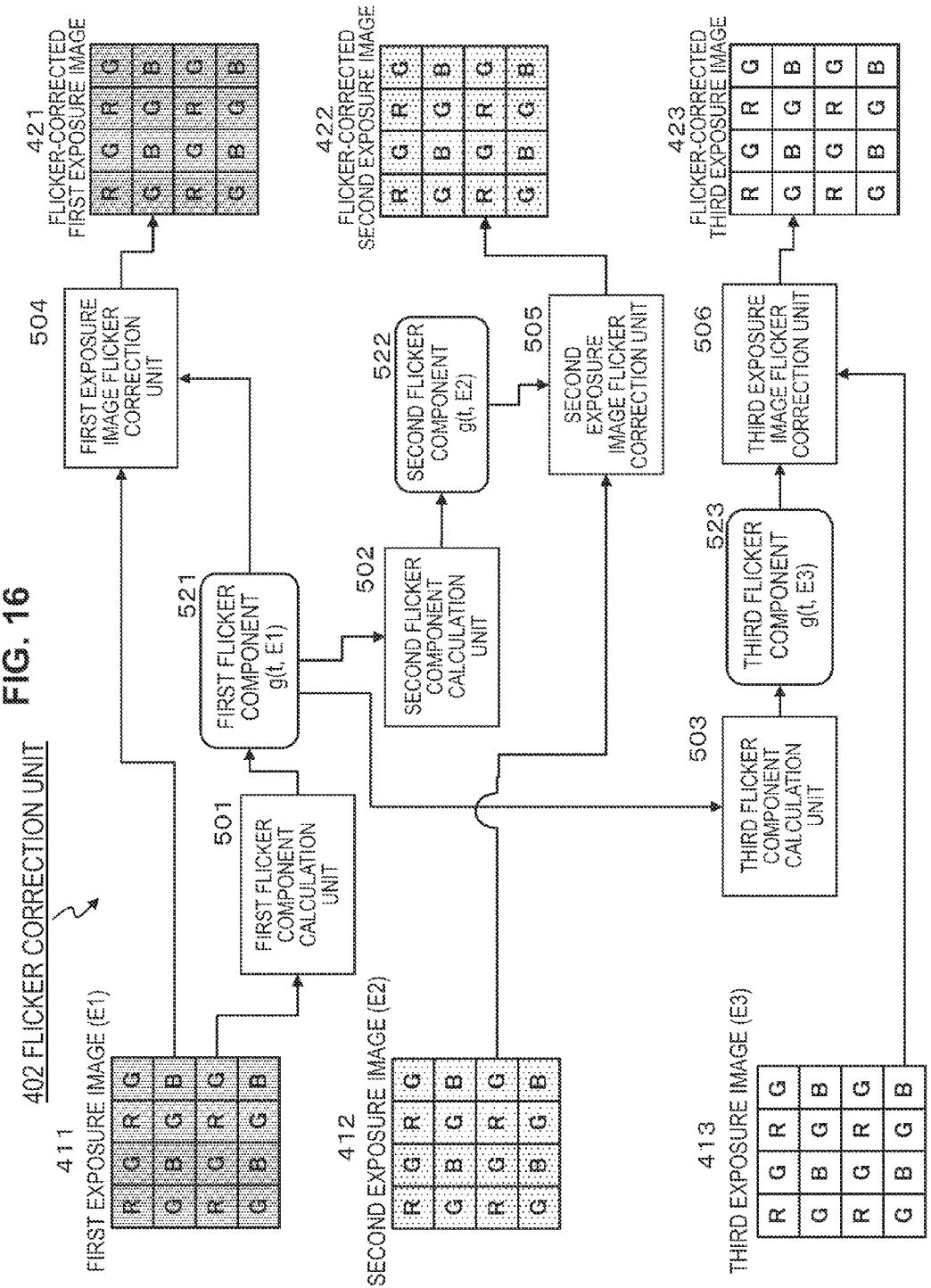
FIG. 16 is a diagram illustrating the configuration and a process of a flicker correction unit.

As shown in FIG. 16, the flicker correction unit 402 is configured to include a first flicker component calculation unit 501, a second flicker component calculation unit 502, a third flicker component calculation unit 503, a first exposure image flicker correction unit 504, a second exposure image flicker correction unit 505, and a third exposure image flicker correction unit 506.

Images input to the flicker correction unit 402 are three images below generated by the sensitivity-classified interpolation unit 401:

(a) the first exposure image 411 of the short-time exposure on the entire screen;

(b) the second exposure image 412 of the middle-time exposure on the entire screen; and (c) the third exposure image 413 of the long-time exposure on the entire screen.

For example, the first exposure image 411 is an image of an exposure time E1, the second exposure image 412 is an image of an exposure time E2, and the third exposure image 413 is an image of an exposure time E3. The exposure times E1, E2, and E3 have the above-described relation of E1<E2<E3.

In this embodiment, by using the first exposure image 411 of the short-time exposure as a reference image used to calculate the flicker component from the first exposure image 411, a process of estimating the flicker component of the second exposure image 412 of the middle-time exposure and the flicker component of the third exposure image 413 of the long-time exposure from the flicker component of the reference image is performed.

First, the first flicker component calculation unit 501 receives an input of the first exposure image 411 of the short-time exposure on the entire screen as a reference image and calculates a first flicker component 321 included in the short-time exposure image.

A process of calculating the flicker component is performed according to the method disclosed in, for example, Japanese Unexamined Patent Application Publication No. 2011-160090.

The "flicker component" of the first exposure image 411 calculated by the first flicker component calculation unit 501 is the "flicker component" described above with reference to Equation 1 and Equation 2, is a ratio of the ideal image with no flicker to an image influenced by the flicker, and is the same as the ratio of the total amount of the illumination light during the accumulation of the pixels.

The flicker component g(t, E) of the pixel at the exposure end time t of the exposure time E in the image sensor becomes the value obtained by Equation 1 and Equation 2 described above.

When the first exposure image 411 is set as the image of the exposure time E1, the first flicker component calculation unit 501 calculates a first flicker component 521 [g(t, E1)] of the first exposure image 411 using the method disclosed in, for example, Japanese Unexamined Patent Application Publication No. 2011-160090.

The value of the flicker component differs for each row of the image with the different exposure end time t.

The second flicker component calculation unit 502 receives an input of the first flicker component 521 of the first exposure image 411 which is the reference image calculated by the first flicker component calculation unit 501, that is, the short-time exposure image, and calculates the second flicker component 522 which is a flicker component of the second exposure image 412 using an exposure ratio of the first exposure image 411 to the second exposure image 412, for example, E1:E2.

The process of calculating the second flicker component 522 in the second flicker component calculation unit 502 is a process performed according to the process described above with reference to FIGS. 4(A) to 4(C) and 5(A) to 5(C).

That is, the second flicker component g(t, E2) is calculated as a linear sum of the first flicker component g(t, E1), as in Equation 3 to Equation 6 described above.

When the second exposure image 412 is set to the image of the exposure time E2, the second flicker component calculation unit 502 calculates the second flicker component [g(t, E2)] of the second exposure image 412 according to Equation 3 to Equation 6 described above.

The value of the flicker component differs for each row of the image with the different exposure end time t.

The third flicker component calculation unit 503 receives an input of the first flicker component 521 of the first exposure image 411 which is the reference image calculated by the first flicker component calculation unit 501, that is, the short-time exposure image, and calculates the third flicker component 523 which is a flicker component of the third exposure image 413 using an exposure ratio of the first exposure image 411 to the third exposure image 413, for example, E1:E3.

The process of calculating the third flicker component 523 in the third flicker component calculation unit 503 is a process performed according to the process described above with reference to FIGS. 4(A) to 4(C) and 5(A) to 5(C).

That is, the third flicker component g(t, E3) is calculated as a linear sum of the first flicker component g(t, E1), as in Equation 3 to Equation 6 described above.

When the third exposure image 413 is set to the image of the exposure time E3, the third flicker component calculation unit 503 calculates the third flicker component [g(t, E3)] of the third exposure image 413 according to Equation 3 to Equation 6 described above.

The value of the flicker component differs for each row of the image with the different exposure end time t.

The first exposure image flicker correction unit 504 receives an input of the first exposure image 411 and the first flicker component 521 calculated by the first flicker component calculation unit 501.

The first exposure image flicker correction unit 504 generates and outputs the flicker-corrected first exposure image 421 from which the flicker component of the first exposure image 411 is removed by multiplying the constituent pixel value of the first exposure image 411 by the reciprocal of the first flicker component 521 calculated by the first flicker component calculation unit 501.

The flicker correction process is the process described above with reference to FIGS. 3(F) to 3(H) and the like. The first exposure image flicker correction unit 504 calculates the correction pixel value by multiplying the pixel value of each corresponding row by the reciprocal of the flicker component calculated in each row unit and outputs the image with the correction pixel value as the flicker-corrected first exposure image 421.

Likewise, the second exposure image flicker correction unit 505 receives an input of the second exposure image 412 and the second flicker component 522 calculated by the second flicker component calculation unit 502.

The second exposure image flicker correction unit 505 generates and outputs the flicker-corrected second exposure image 422 from which the flicker component of the second exposure image 412 is removed by multiplying the constituent pixel value of the second exposure image 412 by the reciprocal of the second flicker component 522 calculated by the second flicker component calculation unit 502.

The flicker correction process is the process described above with reference to FIGS. 3(F) to 3(H) and the like. The second exposure image flicker correction unit 505 calculates the correction pixel value by multiplying the pixel value of each corresponding row by the reciprocal of the flicker component calculated in each row unit and outputs the image with the correction pixel value as the flicker-corrected second exposure image 422.

Likewise, the third exposure image flicker correction unit 506 receives an input of the third exposure image 413 and the third flicker component 523 calculated by the third flicker component calculation unit 503.

The third exposure image flicker correction unit 506 generates and outputs the flicker-corrected third exposure image 423 from which the flicker component of the third exposure image 413 is removed by multiplying the constituent pixel value of the third exposure image 413 by the reciprocal of the third flicker component 523 calculated by the third flicker component calculation unit 503.

The flicker correction process is the process described above with reference to FIGS. 3(F) to 3(H) and the like. The third exposure image flicker correction unit 506 calculates the correction pixel value by multiplying the pixel value of each corresponding row by the reciprocal of the flicker component calculated in each row unit and outputs the image with the correction pixel value as the flicker-corrected third exposure image 423

Thus, the image processing device according to this embodiment calculates the first flicker component corresponding to the image of one exposure time without performing the process of individually calculating the plurality of different flicker components and calculates the flicker component estimated to occur in the image of another exposure time based on the first flicker component.

Since necessary processes can be considerably reduced through this process, reduction in hardware cost or the processing time is realized.

Next, the configuration and a process of the HDR combining unit (wide dynamic range image combining unit) 403 will be described with reference to FIG. 17.

Figure 17:
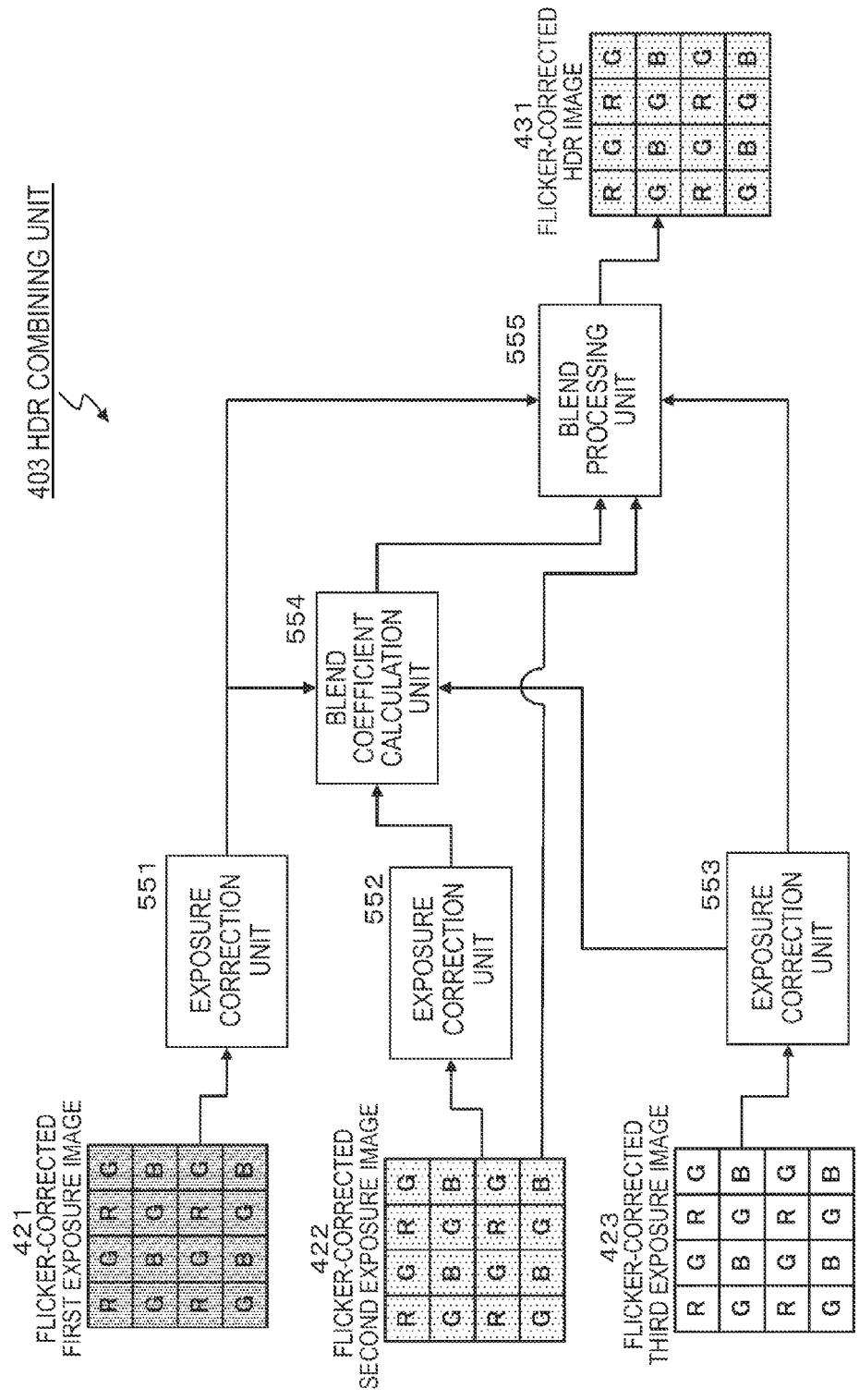
FIG. 17 is a diagram illustrating the configuration and a process of an HDR combining unit (wide dynamic range image combining unit).

As shown in FIG. 17, the HDR combining unit (wide dynamic range image combining unit) 403 includes exposure correction units 551, 552, and 553, a blend coefficient calculation unit 554, and a blend processing unit 555.

The exposure correction units 551, 552 and 553 match brightness of corresponding pixels of the flicker-corrected first exposure image 421, the flicker-corrected second exposure image 422, and the flicker-corrected third exposure image 423 by multiplying by a constant according to the exposure time. For example, when the exposure ratio is 1:2:4, the pixel value of the flicker-corrected first exposure image 421 which is the short-time exposure image is multiplied by 4, the pixel value of the flicker-corrected second exposure image 422 which is the middle-time exposure image is multiplied by 2, and the pixel value of the flicker-corrected third exposure image 423 which is the long-time exposure image is multiplied by 1.

The blend coefficient calculation unit 554 calculates a blend coefficient indicating a blend ratio among the pixel value of the flicker-corrected first exposure image 421, which is the short-time exposure image, subjected to the exposure correction, the pixel value of the flicker-corrected second exposure image 422, which is the middle-time exposure image, subjected to the exposure correction, and the pixel value of the flicker-corrected third exposure image 423, which is the long-time exposure image, subjected to the exposure correction in each corresponding pixel unit.

In the calculation of the blend coefficient, for example, the blend coefficient is set such that a large weight of the pixel value of the short-time exposure image is set in a high-luminance region, a large weight of the pixel value of the long-time exposure image is set in a low-luminance region, and large weights of the pixel values of the middle-time exposure image and the long-time exposure are set in a middle-luminance region.

The pixel values from the low-luminance region to the high-luminance region can be expressed with higher accuracy through the coefficient setting process.

The blend processing unit 555 sets each pixel value of a flicker-corrected HDR image 431 by performing the blend process of blending the corresponding pixel values of the flicker-corrected first exposure image 421 subjected to the exposure correction, the flicker-corrected second exposure image 422 subjected to the exposure correction, and the flicker-corrected third exposure image 423 subjected to the exposure correction according to the blend coefficient calculated by the blend coefficient calculation unit 554.

On the assumption that S is the pixel value of the flicker-corrected first exposure image 421 subjected to the exposure correction, M is the pixel value of the flicker-corrected second exposure image 422 subjected to the exposure correction, and L is the pixel value of the flicker-corrected third exposure image 423 subjected to the exposure correction, and $\alpha 1$, $\alpha 2$, and $\alpha 3$ (where $\alpha 1 + \alpha 2 + \alpha 3 = 1$) are the blend coefficients, a pixel value H of the flicker-corrected HDR image 431 is calculated through the following equation:

$$H = \alpha 1 \times S + \alpha 2 \times M + \alpha 3 \times L.$$

The HDR combining unit (wide dynamic range image combining unit) 403 generates and outputs the flicker-corrected HDR image 431 in which the pixel values from the low-luminance region to the high-luminance region are expressed with high accuracy through the process.

Thus, the HDR image is generated and output through a combining process of combining the images with different exposure times by the HDR combining unit (wide dynamic range image combining unit) 403.

As described above, the image processing device according to the embodiment of the present disclosure, which is configured to generate a wide dynamic range (HDR) image by inputting the image with the plurality of different exposure times, calculates only the flicker component corresponding to one reference exposure image, and estimates and calculates the flicker components of the image with the different exposure times according to the flicker component of the reference exposure image. Thus, since it is not necessary to perform the process of individually calculating the flicker component of each image according each exposure time, the efficient process is realized.

In the first and second embodiments described above, the image sensor configured to set different exposure times in the pixel unit, acquire the images in which the plurality of exposure times are set by performing photographing once, and perform the process has been described. For example, the flicker correction process according to the embodiments of the present disclosure can be applied even to a configuration in which a short-time exposure image and a long-time exposure image are alternately photographed to perform the process.

When the images of different exposure times are photographed at different timings, the exposure timings of the short-time exposure period and the long-time exposure period do not overlap. However, since the flicker varies periodically, as in the above-described embodiments, the flicker component of the reference image can be calculated using one image as the reference image and the flicker component of the images of different exposure times can be calculated based on the flicker component.

For example, the short-time exposure image of the exposure time E1 can be used as the reference image, the flicker component g(t, E1) can be calculated based on the reference image, and the flicker component g(t, E2) of the long-time exposure image of the exposure time E2 can be calculated using the flicker component g(t, E1), as in Equation 3 and Equation 6 described above.

[7. Summarization of Configuration According to Embodiments of the Present Disclosure]

The specific embodiments of the present disclosure have been described above in detail. However, it should be apparent to those skilled in the art that the embodiments may be corrected or substituted beyond the scope of the present disclosure without departing from the gist of the present disclosure. That is, since the present disclosure has been described in the exemplified forms, the present disclosure should not be construed as limiting. To determine the gist of the present disclosure, the claims should be referred to.

Additionally, the present technology may also be configured as below.

(1) An image processing device including:

a first flicker component calculation unit that calculates a flicker component of a first exposure image which is a photographed image of a first exposure time;

a second flicker component calculation unit that calculates a flicker component of a second exposure image which is a photographed image of a second exposure time different from the first exposure time;

a first exposure image flicker correction unit that performs flicker correction on the first exposure image by applying the flicker component of the first exposure image calculated by the first flicker component calculation unit and generates a flicker-corrected first exposure image; and a second exposure image flicker correction unit that performs flicker correction on the second exposure image by applying the flicker component of the second exposure image calculated by the second flicker component calculation unit and generates a flicker-corrected second exposure image, wherein the second flicker component calculation unit calculates the flicker component of the second exposure image as a linear sum of the flicker components of the first exposure images calculated by the first flicker component calculation unit.

(2) The image processing device according to (1), wherein the first flicker component calculation unit calculates a flicker component g(t, E1) of the first exposure image as a function of an exposure time E1 of the first exposure image and an exposure end time t of each pixel of the first exposure image, and wherein the second flicker component calculation unit calculates a flicker component g(t, E2) of the second exposure image of an exposure time E2 as the linear sum of the flicker components g(t, E1) of the first exposure images calculated by the first flicker component calculation unit.

(3) The image processing device according to (1) or (2), wherein the first flicker component calculation unit calculates a flicker component g(t, E1) of the first exposure image as a function of an exposure time E1 of the first exposure image and an exposure end time t of each pixel of the first exposure image, and wherein, when an exposure time E2 of the second exposure image is an integer multiple of the exposure time E1 of the first exposure image, the second flicker component calculation unit calculates a flicker component g(t, E2) of the second exposure image of the exposure time E2 as the linear sum of the flicker components g(t, E1) of a plurality of first exposure images corresponding to different exposure end times t of the first exposure image.

(4) The image processing device according to (1) or (2), wherein the first flicker component calculation unit calculates a flicker component g(t, E1) of the first exposure image as a function of an exposure time E1 of the first exposure image and an exposure end time t of each pixel of the first exposure image, and wherein, when an exposure time E2 of the second exposure image is not an integer multiple of the exposure time E1 of the first exposure image, the second flicker component calculation unit approximates a total amount of environmental light which is a cause of flicker occurrence during an exposure period kE1 less than the exposure time E1 of the first exposure image, where k<1, to k times the total amount of the environmental light within the exposure time E1, and calculates a flicker component g(t, E2) of the second exposure image of the exposure time E2 as the linear sum of the flicker components g(t, E1) of the first exposure images based on the approximation.

(5) The image processing device according to any one of (1) to (4), wherein the first exposure image flicker correction unit generates the flicker-corrected first exposure image by multiplying a pixel value of the first exposure image by a reciprocal of the flicker component of the first exposure image calculated by the first flicker component calculation unit, and wherein the second exposure image flicker correction unit generates the flicker-corrected second exposure image by multiplying a pixel value of the second exposure image by a reciprocal of the flicker component of the second exposure image calculated by the second flicker component calculation unit.

(6) The image processing device according to any one of (1) to (5), further including:

a sensitivity-classified interpolation unit that receives an input of an image formed by a pixel of the first exposure time and a pixel of the second exposure time and generates the first exposure image which is the photographed image of the first exposure time and the second exposure image which is the photographed image of the second exposure time through a pixel interpolation process, wherein the first flicker component calculation unit receives an input of the first exposure image generated by the sensitivity-classified interpolation unit and calculates the flicker component of the first exposure image, and wherein the second flicker component calculation unit receives an input of the second exposure image generated by the sensitivity-classified interpolation unit and calculates the flicker component of the second exposure image.

(7) The image processing device according to any one of (1) to (6), further including:

an image combining unit that generates an output image by performing a combining process of combining the flicker-corrected first exposure image and the flicker-corrected second exposure image.

(8) The image processing device according to any one of (1) to (7), wherein the image combining unit includes an exposure correction unit that performs exposure correction to match brightness of corresponding pixels of the flicker-corrected first exposure image and the flicker-corrected second exposure image, a blend coefficient calculation unit that determines a blend ratio of corresponding pixel values of the flicker-corrected first exposure image and the flicker-corrected second exposure image in accordance with pixel values of the flicker-corrected first exposure image and the flicker-corrected second exposure image, and a blend processing unit that performs a blend process of blending the corresponding pixel values of the flicker-corrected first exposure image and the flicker-corrected second exposure image in accordance with the blend ratio determined by the blend coefficient calculation unit.

Further, a method of a process executed in the aforementioned apparatus or system, a program for executing a process, and a recording medium having the program recorded thereon are all included in the configuration according to an embodiment of the present disclosure.

Furthermore, the processing sequence that is explained in the specification can be implemented by hardware, by software and by a configuration that combines hardware and software. In a case where the processing is implemented by software, it is possible to install in memory within a computer that is incorporated into dedicated hardware a program in which the processing sequence is encoded and to execute the program. It is also possible to install a program in a general-purpose computer that is capable of performing various types of processing and to execute the program. For example, the program can be installed in advance in a storage medium. In addition to being installed in a computer from the storage medium, the program can also be received through a network, such as a local area network (LAN) or the Internet, and can be installed in a storage medium such as a hard disk or the like that is built into the computer.

Note that the various types of processing that are described in this specification may not only be performed in a temporal sequence as has been described, but may also be performed in parallel or individually, in accordance with the processing capacity of the device that performs the processing or as necessary. Furthermore, the system in this specification is not limited to being a configuration that logically aggregates a plurality of devices, all of which are contained within the same housing.

As described above, according to an embodiment of the present disclosure, a device and a method of performing the flicker correction on an image are realized.

Specifically, a first flicker component calculation unit calculates a flicker component of a first exposure image. A second flicker component calculation unit calculates a flicker component of a second exposure image. Flicker correction is performed on the first exposure image by applying the flicker component of the first exposure image. Flicker correction is performed on the second exposure image by applying the flicker component of the second exposure image. An image which is the same as, for example, a wide-dynamic range image is generated through a combining process of combining a flicker-corrected first exposure image and a flicker-corrected second exposure image. The second flicker component calculation unit calculates the flicker component of the second exposure image as a linear sum of the flicker components of the first exposure images calculated by the first flicker component calculation unit.

Since the process of calculating the flicker components is simplified through such processes, efficiency of the hardware configuration and the process is realized.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2012-090897 filed in the Japan Patent Office on Apr. 12, 2012, the entire content of which is hereby incorporated by reference.

What is claimed is:

1. An image processing device comprising:
a first flicker component calculation unit that calculates a plurality of flicker components of a first exposure image, which is a photographed image of a first exposure time;
a second flicker component calculation unit that calculates a flicker component of a second exposure image which is a photographed image of a second exposure time different from the first exposure time;
a first exposure image flicker correction unit that performs flicker correction on the first exposure image by applying the plurality of flicker components of the first exposure image calculated by the first flicker component calculation unit and generates a flicker-corrected first exposure image; and
a second exposure image flicker correction unit that performs flicker correction on the second exposure image by applying the flicker component of the second exposure image calculated by the second flicker component calculation unit and generates a flicker-corrected second exposure image,
wherein the second flicker component calculation unit calculates the flicker component of the second exposure image as a linear sum of at least two of the plurality of flicker components of the first exposure image calculated by the first flicker component calculation unit.

2. The image processing device according to claim 1,
wherein the first flicker component calculation unit calculates each flicker component $g(t, E1)$ of the plurality of flicker components of the first exposure image as a function of an exposure time $E1$ of the first exposure image and an exposure end time t of at least one pixel of the first exposure image, and
wherein the second flicker component calculation unit calculates a flicker component $g(t, E2)$ of the second exposure image of an exposure time $E2$ as the linear sum of at least two of the flicker components $g(t, E1)$ of the plurality of flicker components of the first exposure image calculated by the first flicker component calculation unit.

3. The image processing device according to claim 1,
wherein the first flicker component calculation unit calculates each flicker component $g(t, E1)$ of the plurality of flicker components of the first exposure image as a function of an exposure time $E1$ of the first exposure image and an exposure end time t of at least one pixel of the first exposure image, and
wherein, when an exposure time $E2$ of the second exposure image is an integer multiple M of the exposure time $E1$ of the first exposure image, the second flicker component calculation unit calculates a flicker component $g(t, E2)$ of the second exposure image of the exposure time $E2$ as the linear sum of M flicker components $g(t, E1)$ of the plurality of flicker components of the first exposure image, each flicker component $g(t, E1)$ of the M flicker components corresponding to different exposure end times t of the first exposure image.

4. The image processing device according to claim 1,
wherein the first flicker component calculation unit calculates each flicker component $g(t, E1)$ of the plurality of flicker components of the first exposure image as a function of an exposure time $E1$ of the first exposure image and an exposure end time t of at least one pixel of the first exposure image, and
wherein, when an exposure time $E2$ of the second exposure image is not an integer multiple of the exposure time $E1$ of the first exposure image, the second flicker component calculation unit approximates a total amount of environmental light which is a cause of flicker occurrence during an exposure period $k*E1$ less than the exposure time $E1$ of the first exposure image, where $k<1$, to k times the total amount of the environmental light within the exposure time $E1$, and calculates a flicker component $g(t, E2)$ of the second exposure image of the exposure time $E2$ as the linear sum of at least two of the flicker components $g(t, E1)$ of the plurality of flicker components $g(t, E1)$ of the first exposure image based on the approximation.

5. The image processing device according to claim 1,
wherein the first exposure image flicker correction unit generates the flicker-corrected first exposure image by multiplying a pixel value of the first exposure image by a reciprocal of a corresponding flicker component of the plurality flicker component of the first exposure image calculated by the first flicker component calculation unit, and
wherein the second exposure image flicker correction unit generates the flicker-corrected second exposure image by multiplying a pixel value of the second exposure image by a reciprocal of the flicker component of the second exposure image calculated by the second flicker component calculation unit.

6. The image processing device according to claim 1, further comprising:
a sensitivity-classified interpolation unit that receives an input of an image formed by a pixel of the first exposure time and a pixel of the second exposure time and generates the first exposure image which is the photographed image of the first exposure time and the second exposure image which is the photographed image of the second exposure time through a pixel interpolation process,
wherein the first flicker component calculation unit receives an input of the first exposure image generated by the sensitivity-classified interpolation unit and calculates the plurality of flicker components of the first exposure image, and
wherein the second flicker component calculation unit receives an input of the second exposure image generated by the sensitivity-classified interpolation unit and calculates the flicker component of the second exposure image.

7. The image processing device according to claim 1, further comprising:
an image combining unit that generates an output image by performing a combining process of combining the flicker-corrected first exposure image and the flicker-corrected second exposure image.

8. The image processing device according to claim 7,
wherein the image combining unit includes
an exposure correction unit that performs exposure correction to match brightness of corresponding pixels of the flicker-corrected first exposure image and the flicker-corrected second exposure image,
a blend coefficient calculation unit that determines a blend ratio of corresponding pixel values of the flicker-corrected first exposure image and the flicker-corrected second exposure image in accordance with pixel values of the flicker-corrected first exposure image and the flicker-corrected second exposure image, and
a blend processing unit that performs a blend process of blending the corresponding pixel values of the flicker-corrected first exposure image and the flicker-corrected second exposure image in accordance with the blend ratio determined by the blend coefficient calculation unit.

9. An image processing method performed by an image processing device, the method comprising:
  calculating, by a first flicker component calculation unit, a plurality of flicker components of a first exposure image, which is a photographed image of a first exposure time;
  calculating, by a second flicker component calculation unit, a flicker component of a second exposure image which is a photographed image of a second exposure time different from the first exposure time;
  performing, by a first exposure image flicker correction unit, flicker correction on the first exposure image by applying the plurality of flicker components of the first exposure image calculated by the first flicker component calculation unit and generating a flicker-corrected first exposure image; and
  performing, by a second exposure image flicker correction unit, flicker correction on the second exposure image by applying the flicker component of the second exposure image calculated by the second flicker component calculation unit and generating a flicker-corrected second exposure image,
  wherein, in the step of calculating the flicker component of the second exposure image, the flicker component of the second exposure image is calculated as a linear sum of at least two of the plurality of flicker components of the first exposure image calculated in the step of calculating the flicker component of the first exposure image.

10. A computer readable storage device having a computer program recorded thereon which, when executed by an image processing device, performs a method of image processing, the method comprising:
  calculating a plurality of flicker components of a first exposure image, which is a photographed image of a first exposure time;
  calculating a flicker component of a second exposure image which is a photographed image of a second exposure time different from the first exposure time;
  performing flicker correction on the first exposure image by applying the plurality of flicker components of the first exposure image and generate a flicker-corrected first exposure image; and
  performing flicker correction on the second exposure image by applying the flicker component of the second exposure image and generating a flicker-corrected second exposure image,
  wherein, in the step of calculating the flicker component of the second exposure image, the flicker component of the second exposure image is calculated as a linear sum of at least two of the plurality of flicker components of the first exposure image calculated in the step of calculating the flicker component of the first exposure image.

11. The image processing method according to claim 9, wherein calculating the plurality of flicker components of the first exposure image comprises calculating each flicker component $g(t, E1)$ of the plurality of flicker components of the first exposure image as a function of an exposure time $E1$ of the first exposure image and an exposure end time t of at least one pixel of the first exposure image, and
  wherein calculating the flicker component of the second exposure image comprises calculating each flicker component $g(t, E2)$ of the second exposure image of an exposure time $E2$ as the linear sum of at least two of the flicker components $g(t, E1)$ of the plurality of flicker components of the first exposure image calculated by the first flicker component calculation unit.

12. The image processing method according to claim 9, wherein calculating the plurality of flicker components of the first exposure image comprises calculating each flicker component $g(t, E1)$ of the plurality of flicker components of the first exposure image as a function of an exposure time $E1$ of the first exposure image and an exposure end time t of at least one pixel of the first exposure image, and
  wherein, when an exposure time $E2$ of the second exposure image is an integer multiple, M, of the exposure time $E1$ of the first exposure image, calculating the flicker component of the second exposure image comprises calculating a flicker component $g(t, E2)$ of the second exposure image of the exposure time $E2$ as the linear sum of M flicker components $g(t, E1)$ of the plurality of flicker components of the first exposure image, each flicker component $g(t, E1)$ of the M flicker components corresponding to different exposure end times t of the first exposure image.

13. The image processing method according to claim 9, wherein
  wherein calculating the plurality of flicker components of the first exposure image comprises calculating each flicker component $g(t, E1)$ of the plurality of flicker components of the first exposure image as a function of an exposure time $E1$ of the first exposure image and an exposure end time t of at least one pixel of the first exposure image, and
  wherein, when an exposure time $E2$ of the second exposure image is not an integer multiple of the exposure time $E1$ of the first exposure image, calculating the flicker component of the second exposure image comprises approximating a total amount of environmental light which is a cause of flicker occurrence during an exposure period $k*E1$ less than the exposure time $E1$ of the first exposure image, where $k<1$, to k times the total amount of the environmental light within the exposure time $E1$, and calculating a flicker component $g(t, E2)$ of the second exposure image of the exposure time $E2$ as the linear sum of at least two of the flicker components $g(t, E1)$ of the plurality of flicker components $g(t, E1)$ of the first exposure image based on the approximation.

14. The image processing method according to claim 9, wherein generating the flicker-corrected first exposure image comprises multiplying a pixel value of the first exposure image by a reciprocal of a corresponding flicker component of the plurality flicker component of the first exposure image, and
  wherein generating the flicker-corrected second exposure image comprises multiplying a pixel value of the second exposure image by a reciprocal of the flicker component of the second exposure image.

15. The image processing method according to claim 9, further comprising:
  receiving an input of an image formed by a pixel of the first exposure time and a pixel of the second exposure time and generating the first exposure image which is the photographed image of the first exposure time and the second exposure image which is the photographed image of the second exposure time through a pixel interpolation process,
  wherein the first flicker component calculation unit receives an input of the first exposure image generated by the sensitivity-classified interpolation unit and calculates the plurality of flicker components of the first exposure image, and wherein the second flicker component calculation unit receives an input of the second exposure image generated by the sensitivity-classified interpolation unit and calculates the flicker component of the second exposure image.

16. The image processing device according to claim 9, further comprising:

generating an output image by performing a combining process of combining the flicker-corrected first exposure image and the flicker-corrected second exposure image.

17. The image processing device according to claim 16, wherein generating the output image comprises:

performing exposure correction to match brightness of corresponding pixels of the flicker-corrected first exposure image and the flicker-corrected second exposure image, determining a blend ratio of corresponding pixel values of the flicker-corrected first exposure image and the flicker-corrected second exposure image in accordance with pixel values of the flicker-corrected first exposure image and the flicker-corrected second exposure image, and performing a blend process of blending the corresponding pixel values of the flicker-corrected first exposure image and the flicker-corrected second exposure image in accordance with the blend ratio determined by the blend coefficient calculation unit.

18. The computer readable storage device according to claim 10, wherein calculating the plurality of flicker components of the first exposure image comprises calculating each flicker component $g(t, E1)$ of the plurality of flicker components of the first exposure image as a function of an exposure time $E1$ of the first exposure image and an exposure end time t of at least one pixel of the first exposure image, and wherein calculating the flicker component of the second exposure image comprises calculating each flicker component $g(t, E2)$ of the second exposure image of an exposure time $E2$ as the linear sum of at least two of the flicker components $g(t, E1)$ of the plurality of flicker components of the first exposure image calculated by the first flicker component calculation unit.

19. The computer readable storage device according to claim 10, wherein calculating the plurality of flicker components of the first exposure image comprises calculating each flicker component $g(t, E1)$ of the plurality of flicker components of the first exposure image as a function of an exposure time $E1$ of the first exposure image and an exposure end time t of at least one pixel of the first exposure image, and wherein, when an exposure time $E2$ of the second exposure image is an integer multiple, M, of the exposure time $E1$ of the first exposure image, calculating the flicker component of the second exposure image comprises calculating a flicker component $g(t, E2)$ of the second exposure image of the exposure time $E2$ as the linear sum of M flicker components $g(t, E1)$ of the plurality of flicker components of the first exposure image, each flicker component $g(t, E1)$ of the M flicker components corresponding to different exposure end times t of the first exposure image.

20. The computer readable storage device according to claim 10, wherein calculating the plurality of flicker components of the first exposure image comprises calculating each flicker component $g(t, E1)$ of the plurality of flicker components of the first exposure image as a function of an exposure time $E1$ of the first exposure image and an exposure end time t of at least one pixel of the first exposure image, and wherein, when an exposure time $E2$ of the second exposure image is not an integer multiple of the exposure time $E1$ of the first exposure image, calculating the flicker component of the second exposure image comprises approximating a total amount of environmental light which is a cause of flicker occurrence during an exposure period $k*E1$ less than the exposure time $E1$ of the first exposure image, where $k<1$, to k times the total amount of the environmental light within the exposure time $E1$, and calculating a flicker component $g(t, E2)$ of the second exposure image of the exposure time $E2$ as the linear sum of at least two of the flicker components $g(t, E1)$ of the plurality of flicker components $g(t, E1)$ of the first exposure image based on the approximation.

* * * * *